United States Patent
Bai et al.

(10) Patent No.: US 11,477,760 B2
(45) Date of Patent: Oct. 18, 2022

(54) FREQUENCY DIVERSITY TECHNIQUES FOR SINGLE FREQUENCY NETWORKS

(71) Applicant: QUALCOMM Incorporated, San Diego, CA (US)

(72) Inventors: Tianyang Bai, Somerville, NJ (US); Junyi Li, Chester, NJ (US); Sungwoo Park, Seoul (KR); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/102,956

(22) Filed: Nov. 24, 2020

(65) Prior Publication Data

US 2021/0195555 A1   Jun. 24, 2021

Related U.S. Application Data

(60) Provisional application No. 62/950,832, filed on Dec. 19, 2019.

(51) Int. Cl.
| | |
|---|---|
| *H04W 72/00* | (2009.01) |
| *H04L 5/00* | (2006.01) |
| *H04B 1/713* | (2011.01) |
| *H04L 1/18* | (2006.01) |

(52) U.S. Cl.
CPC .......... *H04W 72/005* (2013.01); *H04B 1/713* (2013.01); *H04L 1/18* (2013.01); *H04L 5/0023* (2013.01); *H04L 5/0055* (2013.01)

(58) Field of Classification Search
CPC .... H04B 1/713; H04B 1/7143; H04B 7/0617; H04B 7/12; H04L 1/18; H04L 1/1893; H04L 1/1896; H04L 2001/0093; H04L 5/0007; H04L 5/0012; H04L 5/0023; H04L 5/0055; H04W 72/005
See application file for complete search history.

(56) References Cited

U.S. PATENT DOCUMENTS

| | | | | |
|---|---|---|---|---|
| 8,149,942 B1 * | 4/2012 | Wang | ................... | H04B 7/0626 |
| | | | | 375/267 |
| 8,300,620 B1 * | 10/2012 | Sarkar | ................... | H04L 1/1809 |
| | | | | 370/230 |
| 8,553,743 B1 * | 10/2013 | Nichols | ................. | H04B 1/715 |
| | | | | 375/135 |

(Continued)

OTHER PUBLICATIONS

Partial International Search Report—PCT/US2020/062348—ISA/EPO—dated Feb. 23, 2021.

(Continued)

*Primary Examiner* — Dung B Huynh
(74) *Attorney, Agent, or Firm* — Holland & Hart LLP

(57) ABSTRACT

Methods, systems, and devices for wireless communications are described. Some wireless communications networks may implement aspects of a single frequency network (SFN), which may support multicast and broadcast transmissions. In some cases, a base station may use directional beamforming techniques to transmit a message to a user equipment (UE) using a first frequency configuration of the SFN. The base station may adjust the first frequency configuration to a second frequency configuration, and may transmit a retransmission of the message to the UE using the second frequency configuration.

29 Claims, 18 Drawing Sheets

(56) References Cited

U.S. PATENT DOCUMENTS

| | | | | |
|---|---|---|---|---|
| 8,934,351 | B2* | 1/2015 | Matsui | H04L 43/0847 701/29.7 |
| 9,668,102 | B1* | 5/2017 | Ananth | H04W 84/022 |
| 10,084,529 | B1* | 9/2018 | Riechers | H04B 7/18506 |
| 10,594,360 | B2* | 3/2020 | Vijayasankar | H04B 1/7143 |
| 2002/0159434 | A1* | 10/2002 | Gosior | H04N 21/4126 370/336 |
| 2006/0240785 | A1* | 10/2006 | Fischer | H04B 1/40 455/78 |
| 2008/0287075 | A1* | 11/2008 | Kim | H04B 7/0671 455/101 |
| 2008/0298322 | A1* | 12/2008 | Chun | H04L 69/03 370/335 |
| 2009/0040959 | A1* | 2/2009 | Jung | H04L 1/1867 370/312 |
| 2009/0116575 | A1* | 5/2009 | Hochwald | H04B 7/0671 375/267 |
| 2009/0316758 | A1* | 12/2009 | Ahn | H04B 1/7143 375/135 |
| 2010/0020893 | A1* | 1/2010 | Hoshino | H04B 7/068 375/267 |
| 2010/0113053 | A1* | 5/2010 | Bienas | H04W 74/085 455/452.1 |
| 2010/0180173 | A1* | 7/2010 | Batra | H04L 1/1812 714/751 |
| 2011/0007779 | A1* | 1/2011 | Nanri | H04L 5/0007 375/135 |
| 2011/0053492 | A1* | 3/2011 | Hochstein | H05B 47/19 455/7 |
| 2011/0205996 | A1* | 8/2011 | Kim | H04W 28/06 370/329 |
| 2011/0230180 | A1* | 9/2011 | Akiyama | H04W 16/00 455/422.1 |
| 2012/0002616 | A1* | 1/2012 | Ishii | H04B 1/713 370/329 |
| 2012/0087442 | A1* | 4/2012 | Xu | H04L 5/005 375/299 |
| 2014/0203969 | A1* | 7/2014 | Maltsev | H04B 7/0617 342/385 |
| 2015/0131523 | A1* | 5/2015 | Balter | H04B 7/18515 370/317 |
| 2015/0350992 | A1* | 12/2015 | Han | H04W 36/26 370/331 |
| 2015/0358106 | A1* | 12/2015 | Limberg | H04L 1/0058 375/320 |
| 2015/0382334 | A1* | 12/2015 | El Ayach | H04W 72/0406 370/336 |
| 2016/0050001 | A1* | 2/2016 | Kang | H04W 72/0406 370/329 |
| 2016/0295557 | A1* | 10/2016 | Azarian Yazdi | H04W 72/042 |
| 2017/0047968 | A1* | 2/2017 | Moshfeghi | H04B 5/0037 |
| 2017/0126274 | A1* | 5/2017 | Kang | H04W 74/006 |
| 2017/0180436 | A1* | 6/2017 | Ström | H04N 21/4788 |
| 2017/0187494 | A1* | 6/2017 | Tirronen | H04W 72/0413 |
| 2017/0238313 | A1* | 8/2017 | Wang | H04W 72/0413 370/329 |
| 2017/0347268 | A1* | 11/2017 | Chen | H04L 5/0053 |
| 2018/0062451 | A1* | 3/2018 | Rajapaksa | H02J 3/383 |
| 2018/0070363 | A1* | 3/2018 | Chakraborty | H04W 24/08 |
| 2018/0146419 | A1* | 5/2018 | Raghavan | H04W 48/16 |
| 2018/0146478 | A1* | 5/2018 | Kim | H04W 4/06 |
| 2018/0183491 | A1* | 6/2018 | Takeda | H04W 16/26 |
| 2018/0262313 | A1* | 9/2018 | Nam | H04W 72/0446 |
| 2018/0279296 | A1* | 9/2018 | Hosseini | H04W 72/0413 |
| 2018/0295626 | A1* | 10/2018 | Ma | H04L 5/0092 |
| 2018/0302803 | A1* | 10/2018 | Ramachandra | H04W 56/001 |
| 2018/0310341 | A1* | 10/2018 | Yerramalli | H04W 74/0833 |
| 2018/0351707 | A1* | 12/2018 | Wang | H04W 16/14 |
| 2019/0037564 | A1* | 1/2019 | Li | H04W 72/0446 |
| 2019/0074936 | A1* | 3/2019 | Lee | H04W 76/27 |
| 2019/0116530 | A1* | 4/2019 | Da Silva | H04W 36/0094 |
| 2019/0149249 | A1* | 5/2019 | Raghavan | H04B 7/061 455/424 |
| 2019/0158228 | A1* | 5/2019 | Wang | H04L 43/0829 |
| 2019/0158257 | A1* | 5/2019 | Sano | H04W 28/04 |
| 2019/0215810 | A1* | 7/2019 | Mu | H04L 1/1896 |
| 2019/0229856 | A1* | 7/2019 | Sano | H04L 1/189 |
| 2019/0239123 | A1* | 8/2019 | Kim | H04W 88/023 |
| 2019/0246388 | A1* | 8/2019 | Seo | H04L 5/0082 |
| 2019/0289623 | A1* | 9/2019 | Kim | H04W 72/02 |
| 2019/0319686 | A1* | 10/2019 | Chen, IV | H04W 72/046 |
| 2019/0320471 | A1 | 10/2019 | Ohara et al. | |
| 2019/0327716 | A1* | 10/2019 | Wang | H04B 17/364 |
| 2019/0341989 | A1* | 11/2019 | Raghavan | H04B 17/327 |
| 2019/0349136 | A1* | 11/2019 | Kilinc | H04L 1/08 |
| 2019/0349891 | A1* | 11/2019 | Rune | H04W 56/001 |
| 2019/0375425 | A1* | 12/2019 | Harrison | B60W 30/08 |
| 2020/0021402 | A1* | 1/2020 | Xu | H04L 1/1887 |
| 2020/0022104 | A1* | 1/2020 | Geng | H04W 68/00 |
| 2020/0037385 | A1* | 1/2020 | Park | H04B 7/0695 |
| 2020/0053673 | A1* | 2/2020 | Reial | H04W 56/001 |
| 2020/0067685 | A1* | 2/2020 | Awad | H04L 5/0053 |
| 2020/0083933 | A1* | 3/2020 | Peng | H04L 5/0044 |
| 2020/0084759 | A1* | 3/2020 | Liu | H04W 72/082 |
| 2020/0092064 | A1* | 3/2020 | Tang | H04W 72/0453 |
| 2020/0112878 | A1* | 4/2020 | Liu | H04W 28/04 |
| 2020/0137827 | A1* | 4/2020 | Cariou | H04L 1/1621 |
| 2020/0162221 | A1* | 5/2020 | Wong | H04L 1/1671 |
| 2020/0178088 | A1* | 6/2020 | Lo | H01Q 1/246 |
| 2020/0178121 | A1* | 6/2020 | Simon | H04H 20/18 |
| 2020/0195389 | A1* | 6/2020 | Basu Mallick | H04L 1/1887 |
| 2020/0214073 | A1* | 7/2020 | Shimoda | H04W 16/32 |
| 2020/0221363 | A1* | 7/2020 | Lee | H04W 36/32 |
| 2020/0287589 | A1* | 9/2020 | Li | H04W 72/0446 |
| 2020/0314918 | A1* | 10/2020 | Zhu | H04W 76/27 |
| 2020/0344810 | A1* | 10/2020 | Xiong | H04L 5/0091 |
| 2020/0359438 | A1* | 11/2020 | Tsuboi | H04W 76/14 |
| 2020/0374898 | A1* | 11/2020 | Lin | H04W 76/14 |
| 2020/0382157 | A1* | 12/2020 | Bhamri | H04B 1/7156 |
| 2020/0382171 | A1* | 12/2020 | Uchino | H04W 16/28 |
| 2020/0404617 | A1* | 12/2020 | Murray | H04W 52/0229 |
| 2021/0014829 | A1* | 1/2021 | Kalhan | G16Y 40/35 |
| 2021/0028889 | A1* | 1/2021 | Stathakis | H04W 28/0284 |
| 2021/0036437 | A1* | 2/2021 | Zhang | H01Q 21/293 |
| 2021/0037447 | A1* | 2/2021 | Tarighat Mehrabani | H04W 40/248 |
| 2021/0045017 | A1* | 2/2021 | Takeda | H04W 76/27 |
| 2021/0058111 | A1* | 2/2021 | Liu | H04W 24/08 |
| 2021/0084123 | A1* | 3/2021 | Banerjee | H04L 1/1642 |
| 2021/0084625 | A1* | 3/2021 | Ryu | H04W 56/0005 |
| 2021/0160028 | A1* | 5/2021 | Park | H04B 7/0695 |
| 2021/0160780 | A1* | 5/2021 | Liu | H04L 5/0048 |
| 2021/0195451 | A1* | 6/2021 | Da Silva | H04W 36/0085 |
| 2021/0195603 | A1* | 6/2021 | Jiang | H04W 56/001 |
| 2021/0212103 | A1* | 7/2021 | Lin | H04W 72/1289 |
| 2021/0212123 | A1* | 7/2021 | Reial | H04W 72/08 |
| 2021/0243567 | A1* | 8/2021 | Takano | H04W 4/06 |
| 2021/0281308 | A1* | 9/2021 | Wong | H04B 7/0632 |
| 2021/0297939 | A1* | 9/2021 | Lu | H04W 4/70 |
| 2021/0329595 | A1* | 10/2021 | Tang | H04W 72/0486 |
| 2022/0011749 | A1* | 1/2022 | Lee | H04L 63/0823 |
| 2022/0103301 | A1* | 3/2022 | Zhu | H04L 1/1816 |
| 2022/0123878 | A1* | 4/2022 | Takada | H04L 5/0066 |

OTHER PUBLICATIONS

Selinis I., et al., "The Race to 5G Era; LTE and Wi-Fi", IEEE Access, vol. 6, Oct. 8, 2018 (Oct. 8, 2018), pp. 56598-56636, XP011693652, DOI: 10.1109/ACCESS.2018.2867729 [retrieved on Oct. 19, 2018] Section 3), p. 56611.

International Search Report and Written Opinion—PCT/US2020/062348—ISA/EPO—dated Apr. 13, 2021.

\* cited by examiner

FREQUENCY DIVERSITY TECHNIQUES FOR SINGLE FREQUENCY NETWORKS

CROSS REFERENCE

The present Application for Patent claims the benefit of U.S. Provisional Patent Application No. 62/950,832 by BAI et al., entitled "FREQUENCY DIVERSITY TECHNIQUES FOR SINGLE FREQUENCY NETWORKS," filed Dec. 19, 2019, assigned to the assignee hereof, and expressly incorporated herein.

FIELD OF TECHNOLOGY

The following relates generally to wireless communications and more specifically to frequency diversity techniques for single frequency networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may use a single frequency network (SFN) channel for transmitting data. The SFN channel may be used for various types of communications in the system, such as, for example, multicast and broadcast communications. Beamformed transmissions may in some cases be used to transmit such communications. The beamformed transmissions, however, may be prone to shorter delay spread, narrowband fading, and other challenges that may cause interference at a UE receiving multicast or broadcast data.

SUMMARY

The described techniques relate to improved methods, systems, devices, and apparatuses that support frequency diversity techniques for single frequency networks. Generally, the described techniques provide for the reduction of interference for broadcast transmissions between a base station and user equipment in a single frequency network (SFN) channel. In some examples, the SFN may support multicast and broadcast transmissions from various devices in the network.

In some cases, a base station may communicate using directional beamforming with a user equipment (UE) and may use a directional beam to send a broadcast message according to a first frequency configuration of the SFN channel. The directional beam, however, may be associated with increased interference at a UE (e.g., due to interfering broadcast messages from another base station), and the UE may transmit a hybrid automatic repeat request (HARD) feedback message (e.g., a negative acknowledgement (NACK) message) to the base station indicating that the broadcast message was improperly received, or that the broadcast message was not received at all. The UE may in some examples request retransmission of the broadcast message using the NACK or by using other signaling, and the UE may be configured to receive retransmissions from the base station. The base station may adjust the first frequency configuration used to transmit the broadcast message to a second frequency configuration using various frequency diversity techniques such as frequency hopping or cyclic diversity delay (CDD) techniques. The base station may transmit a retransmission of the broadcast message using the second frequency configuration of the SFN channel.

A method of wireless communications at a base station is described. The method may include transmitting a message with a first frequency configuration over a single frequency network channel using a directional beam, adjusting the first frequency configuration to a second frequency configuration different from the first frequency configuration, and transmitting a retransmission of the message with the second frequency configuration over the single frequency network channel.

An apparatus for wireless communications at a base station is described. The apparatus may include a processor, memory coupled with the processor, and instructions stored in the memory. The instructions may be executable by the processor to cause the apparatus to transmit a message with a first frequency configuration over a single frequency network channel using a directional beam, adjust the first frequency configuration to a second frequency configuration different from the first frequency configuration, and transmit a retransmission of the message with the second frequency configuration over the single frequency network channel.

Another apparatus for wireless communications at a base station is described. The apparatus may include means for transmitting a message with a first frequency configuration over a single frequency network channel using a directional beam, adjusting the first frequency configuration to a second frequency configuration different from the first frequency configuration, and transmitting a retransmission of the message with the second frequency configuration over the single frequency network channel.

A non-transitory computer-readable medium storing code for wireless communications at a base station is described. The code may include instructions executable by a processor to transmit a message with a first frequency configuration over a single frequency network channel using a directional beam, adjust the first frequency configuration to a second frequency configuration different from the first frequency configuration, and transmit a retransmission of the message with the second frequency configuration over the single frequency network channel.

In some examples of the method, apparatuses, and non-transitory computer-readable medium described herein, adjusting the first frequency configuration may include operations, features, means, or instructions for applying a frequency hopping pattern to the retransmission of the message.

Some examples of the method, apparatuses, and non-transitory computer-readable medium described herein may further include operations, features, means, or instructions for transmitting an indication of the frequency hopping pattern.

In some examples of the method, apparatuses, and non-transitory computer-readable medium described herein, the first frequency configuration includes a first set of tones allocated for the message and the second frequency configuration includes a second set of tones allocated for the retransmission of the message that may be different than the first set of tones.

In some examples of the method, apparatuses, and non-transitory computer-readable medium described herein, adjusting the first frequency configuration may include operations, features, means, or instructions for applying a cyclic diversity delay to the retransmission of the message.

Some examples of the method, apparatuses, and non-transitory computer-readable medium described herein may further include operations, features, means, or instructions for transmitting an indication of the cyclic diversity delay.

Some examples of the method, apparatuses, and non-transitory computer-readable medium described herein may further include operations, features, means, or instructions for receiving a request from a UE to apply the cyclic diversity delay.

In some examples of the method, apparatuses, and non-transitory computer-readable medium described herein, applying the cyclic diversity delay to the retransmission of the message may include operations, features, means, or instructions for transmitting the message using a first antenna, applying a first phase delay to at least a portion of the message at a second antenna, and transmitting the retransmission of the message based on the first phase delay.

Some examples of the method, apparatuses, and non-transitory computer-readable medium described herein may further include operations, features, means, or instructions for transmitting a second retransmission of the message based on a second phase delay that may be different than the first phase delay.

Some examples of the method, apparatuses, and non-transitory computer-readable medium described herein may further include operations, features, means, or instructions for receiving a negative acknowledgement associated with the message, where transmitting the retransmission of the message may be based on receiving the negative acknowledgement.

In some examples of the method, apparatuses, and non-transitory computer-readable medium described herein, the negative acknowledgement includes a retransmission request associated with the message.

In some examples of the method, apparatuses, and non-transitory computer-readable medium described herein, the retransmission may be transmitted automatically.

Some examples of the method, apparatuses, and non-transitory computer-readable medium described herein may further include operations, features, means, or instructions for transmitting the retransmission of the message upon expiration of a gap after transmitting the message.

In some examples of the method, apparatuses, and non-transitory computer-readable medium described herein, the message includes a broadcast message.

In some examples of the method, apparatuses, and non-transitory computer-readable medium described herein, the single frequency network channel includes a multimedia broadcast single frequency network channel.

A method of wireless communications at a UE is described. The method may include receiving a message with a first frequency configuration over a single frequency network channel using a directional beam and receiving a retransmission of the message with a second frequency configuration over the single frequency network channel.

An apparatus for wireless communications at a UE is described. The apparatus may include a processor, memory coupled with the processor, and instructions stored in the memory. The instructions may be executable by the processor to cause the apparatus to receive a message with a first frequency configuration over a single frequency network channel using a directional beam and receive a retransmission of the message with a second frequency configuration over the single frequency network channel.

Another apparatus for wireless communications at a UE is described. The apparatus may include means for receiving a message with a first frequency configuration over a single frequency network channel using a directional beam and receiving a retransmission of the message with a second frequency configuration over the single frequency network channel.

A non-transitory computer-readable medium storing code for wireless communications at a UE is described. The code may include instructions executable by a processor to receive a message with a first frequency configuration over a single frequency network channel using a directional beam and receive a retransmission of the message with a second frequency configuration over the single frequency network channel.

Some examples of the method, apparatuses, and non-transitory computer-readable medium described herein may further include operations, features, means, or instructions for receiving the retransmission of the message according to a frequency hopping pattern, where at least the second frequency configuration may be based on the frequency hopping pattern.

Some examples of the method, apparatuses, and non-transitory computer-readable medium described herein may further include operations, features, means, or instructions for receiving an indication of the frequency hopping pattern.

Some examples of the method, apparatuses, and non-transitory computer-readable medium described herein may further include operations, features, means, or instructions for receiving the retransmission of the message from a first node according to a first cyclic diversity delay, where at least the second frequency configuration may be based on the first cyclic diversity delay.

Some examples of the method, apparatuses, and non-transitory computer-readable medium described herein may further include operations, features, means, or instructions for receiving an indication of the cyclic diversity delay.

Some examples of the method, apparatuses, and non-transitory computer-readable medium described herein may further include operations, features, means, or instructions for receiving a second retransmission of the message from the first node based on a second cyclic diversity delay that may be different than the first cyclic diversity delay.

Some examples of the method, apparatuses, and non-transitory computer-readable medium described herein may further include operations, features, means, or instructions for receiving a retransmission of the message from a second node according to a third cyclic diversity delay that may be different from the first cyclic diversity delay.

Some examples of the method, apparatuses, and non-transitory computer-readable medium described herein may further include operations, features, means, or instructions for transmitting a request to a base station to apply the cyclic diversity delay.

Some examples of the method, apparatuses, and non-transitory computer-readable medium described herein may further include operations, features, means, or instructions for transmitting a negative acknowledgement associated with the message.

In some examples of the method, apparatuses, and non-transitory computer-readable medium described herein, the negative acknowledgement includes a retransmission request associated with the message.

Some examples of the method, apparatuses, and non-transitory computer-readable medium described herein may further include operations, features, means, or instructions for receiving the retransmission of the message upon expiration of a gap after receiving the message.

DETAILED DESCRIPTION

Figure 1:
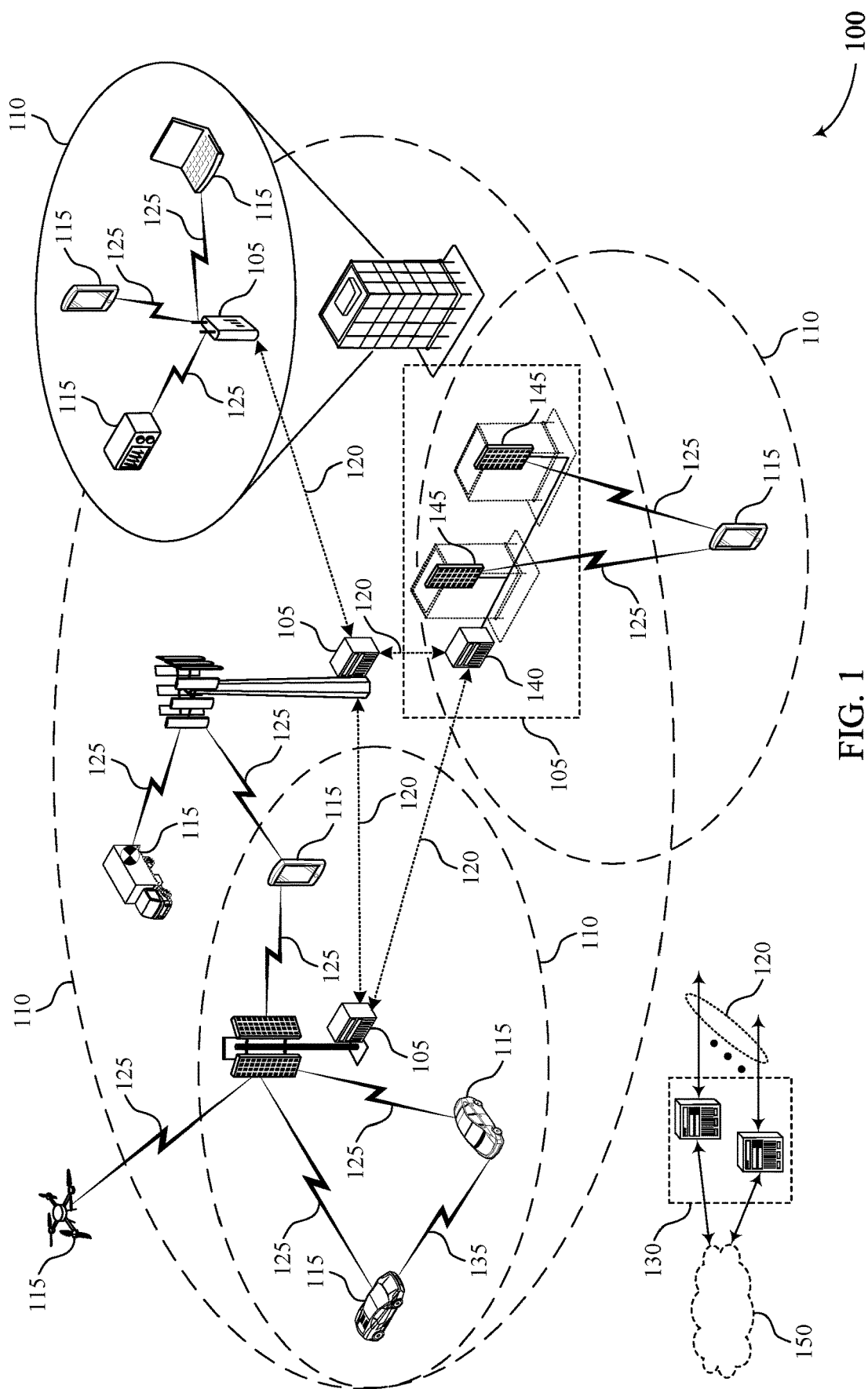
FIG. 1 illustrates an example of a wireless communications system that supports frequency diversity techniques for single frequency networks in accordance with aspects of the present disclosure.

In some wireless communications systems, a single frequency network (SFN) channel may be used for various communications types such as those associated with multicast and broadcast transmissions. In some cases, devices may implement beamforming techniques to transmit messages using the SFN channel using directional beams. The directional beams, however, may be associated with shorter delay spread, narrowband fading, and increased interference at a user equipment (UE), which may be receiving broadcast communications from multiple base stations in the SFN.

The UE may transmit feedback to the base station (e.g., hybrid automatic repeat request (HARQ) feedback such as a NACK) to notify the base station that the broadcast message was improperly received (e.g., only partially received) due to interference, or that the broadcast message was not received at all. In some cases, the UE may transmit a NACK to request a retransmission of the broadcast message that was originally transmitted from the base station or multiple base stations.

To reduce interference and increase communications quality, one or more base stations in the network may retransmit the broadcast message by applying various frequency diversity techniques to the retransmission of the broadcast message. In one example, the base station or base stations may apply frequency hopping to one or more retransmissions of the broadcast message, which may include using one set of tones for the transmission of the broadcast message, and a different set of tones for retransmission of the broadcast message. In another example, the base station may increase frequency diversity of the retransmission by applying different cyclic diversity delays to one or more retransmissions of the broadcast message. For example, the base station may transmit the broadcast message on a first tone and may add a cyclic diversity delay to the retransmission of the broadcast message on a different tone. In such examples, the retransmission may be a cyclically shifted version of the original broadcast message. Each base station in the SFN may apply different cyclic diversity delay values to each retransmission. In addition, cyclic diversity delay values for retransmissions may also be different across different base stations.

One or more base stations may notify the UE of the different frequency diversity techniques by transmitting an indication which includes information of the different frequency diversity techniques used (e.g., frequency hopping, cyclic diversity delay (CDD)). In some cases, the UE may transmit a request to the base station of a certain frequency diversity technique to use (e.g., as part of a NACK message transmitted by the UE).

Aspects of the disclosure are initially described in the context of wireless communications systems. Additional aspects of the disclosure are described with respect to various frequency diversity techniques implemented by a base station to reduce interference for broadcast transmissions to a UE in an SFN. Aspects of the disclosure are further illustrated by and described with reference to apparatus diagrams, system diagrams, and flowcharts that relate to frequency diversity techniques for single frequency networks.

FIG. 1 illustrates an example of a wireless communications system 100 that supports frequency diversity techniques for single frequency networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunications system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, wireless communications system 100 may be an example of an SFN which may support multicast and broadcast transmissions, among other communication types. In some cases, devices such as a base station 105 may communicate with a UE 115 using directional beamforming. The directional beams, however, may be associated with increased interference at a UE 115.

In some cases, UE 115 may transmit a NACK to the base station 105 indicating that the broadcast message was improperly received, or that the broadcast message was not received at all. The UE 115 may in some examples request retransmission of the broadcast message using the NACK or by using other signaling. In some examples, a base station 105 may be configured to send retransmissions of the broadcast message automatically (e.g., even in the absence of receiving a NACK from the UE 115). To reduce interference and increase communications quality, the base station 105 may apply various frequency diversity techniques to the retransmission of the broadcast message. In one example, the base station 105 may apply frequency hopping to one or more retransmissions of the broadcast message, which may include using one set of tones for the transmission of the broadcast message and a different set of tones for retransmission of the broadcast message. In another example, the base station 105 may increase frequency diversity by applying different cyclic diversity delays to one or more retransmissions of the broadcast message transmitted to UE 115. For example, the base station 105 may transmit the broadcast message on a first tone, and may add a cyclic diversity delay to the retransmission of the broadcast message on a different tone. In such examples, the retransmission may be a cyclically shifted version of the original broadcast message. Each base station 105 in the SFN may apply different cyclic diversity delay values to each retransmission.

Aspects of the disclosure are initially described in the context of wireless communications systems. Additional aspects of the disclosure are described with respect to various frequency diversity techniques implemented by a base station to reduce interference for broadcast transmissions to a UE in an SFN. Aspects of the disclosure are further illustrated by and described with reference to apparatus diagrams, system diagrams, and flowcharts that relate to frequency diversity techniques for single frequency networks.

Figure 2:
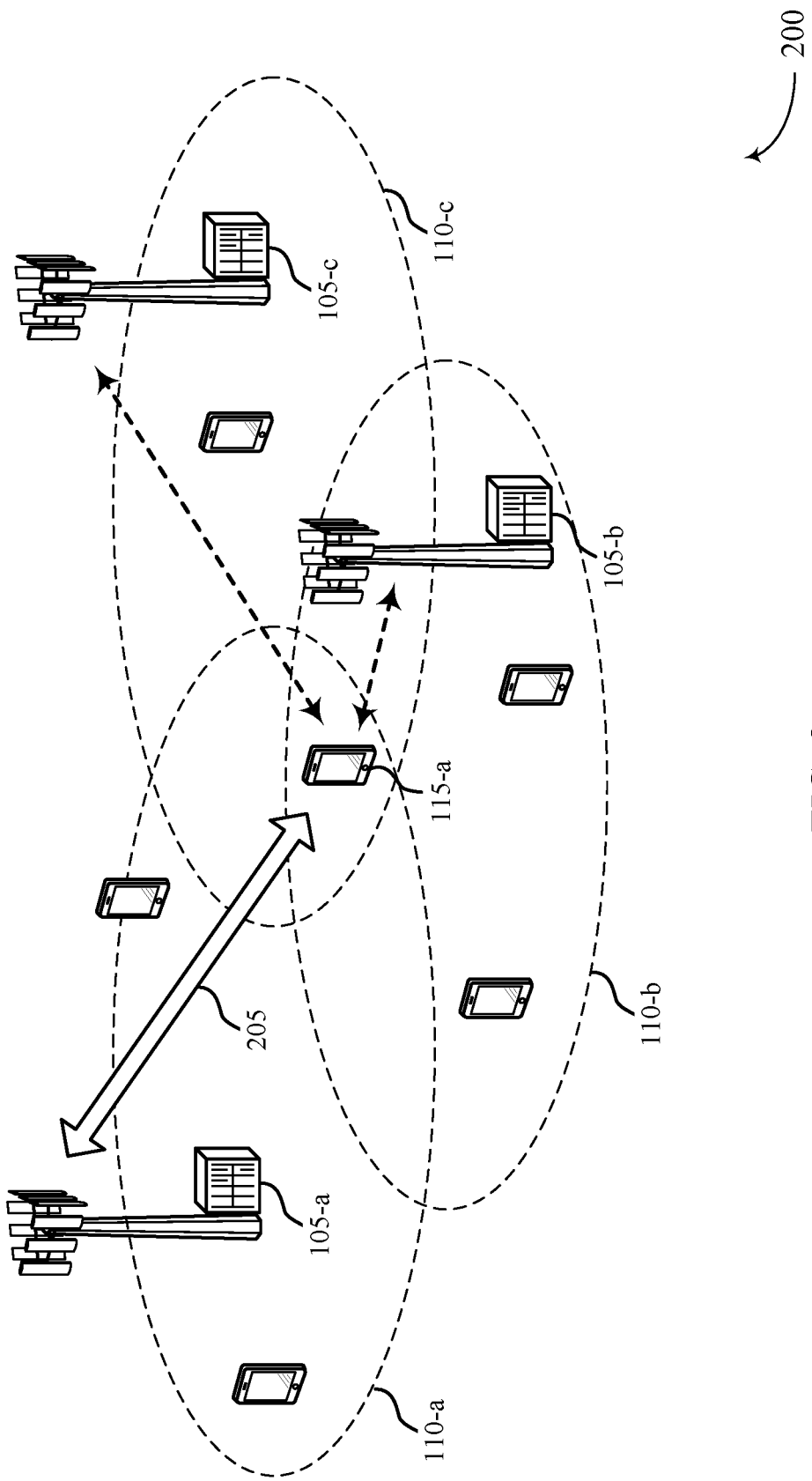
FIG. 2 illustrates an example of a wireless communications system that supports frequency diversity techniques for single frequency networks in accordance with aspects of the present disclosure.

FIG. 2 illustrates an example of a wireless communications system 200 that supports frequency diversity techniques for single frequency networks in accordance with aspects of the present disclosure. In some examples, wireless communications system 200 may implement aspects of wireless communications system 100. The wireless communications system 200 may include base stations 105-a, 105-b, and 105-c along with a UE 115-a, which may be examples of a base station 105 and a UE 115 as described with reference to FIG. 1.

Wireless communications system 200 may include a number of base stations 105, each simultaneously supporting communications for various UEs 115 in the system. In wireless communications system 200, one or more base stations 105 may transmit downlink data to a UE 115-a or group of UEs via communication links 205 to increase the probability that the UE 115-a or group of UEs successfully receives the downlink data. In some cases, the wireless communications system 200 may include multiple cells 110 as part of a single frequency network (SFN), where each of the base stations 105 may use the same frequency band to transmit downlink data. In an SFN, a group of UEs may receive the same downlink data by sharing resources used for data transmission. For example, base station 105-a may coordinate with base stations 105-b and 105-c to transmit data using broadcast or multicast techniques over a given dedicated area (e.g., the area of wireless communications system 200). In such cases, the base stations 105 may use a single frequency band to transmit downlink data to UE 115-a or the group of UEs to save resources and increase network efficiency.

In some wireless communications systems including NR networks (e.g., mmW systems supporting greater than 24 GHz frequencies), various techniques such as error correction, HARQ, and signal retransmission may be employed to boost signal-to-noise ratio (SNR) and improve communications reliability.

In addition, feedback such as ACK/NACK feedback transmitted from receiving UEs may prompt data retransmissions in wireless networks (e.g., SFNs) which may support delay-sensitive and high reliability applications (e.g., enhanced mobile broadband (eMBB), ultra-reliable and low latency communications (URLLC)). In some cases, however, a base station 105 may receive acknowledgement (ACK) messages from multiple UEs 115, and a delay in receiving the ACK messages from all of the UEs 115 may be associated with inefficient usage of network resources. Additionally or alternatively, a UE 115 may receive a broadcast or multicast message from a base station 105 which may collide with an ACK/NACK transmission or data retransmission transmitted on the SFN broadcast channel (e.g., such as in cases of narrowband fading). In such cases, frequency diversity may be increased for retransmissions using techniques such as multiplexing (e.g., spatial multiplexing, FDM, TDM, etc.), frequency hopping, and applied cyclic diversity delays may be employed to make the SFN channel more robust (e.g., more reliable, less prone to channel fading). In addition, different beam sweep parameters may be used to send retransmissions in the SFN.

In one example, a UE 115 or base station 105 may use directional beamforming to focus energy from a transmission in one or more directions. In some cases, directional beams may be used in combination with transmit diversity to improve coverage and signal strength of received transmissions. In some other cases, however, the use of directional beams may shorten the delay spread of the channel and may reduce the frequency diversity of received signals (e.g., channel fading may be more frequency-flat). In some other examples, a UE 115 may receive signals from multiple different transmission reception points (TRPs) associated with a base station or multiple base stations, and the UE 115 may combine the received signals from different TRPs or base stations together. In such examples, the UE 115 may receive the data from the TRPs using one or more directional beams.

In another example, a base station 105 may use various multiplexing techniques to broadcast data to a group of UEs (e.g., to each UE 115 in the cell). For example, a base station 105 may transmit the same information in different directions in a TDM/FDM manner using different beams (e.g., using beam sweeping). In some cases, base station 105 may use spatial multiplexing to transmit different streams of data simultaneously on the same frequency. In such cases, the data streams may be transmitted to a single UE 115 to increase the data rate, or the data streams may be transmitted to multiple UEs 115 to increase system capacity. In addition, a network may indicate a relaxed (e.g., increased) initial block error rate (BLER) rate to increase the capacity of the system while maintaining a threshold quality of service (QoS) for communications.

In some cases, UE 115-a may incorrectly receive downlink data from one or more base stations 105 (e.g., the data may be corrupted or incomplete), or UE 115-a may fail to receive the downlink data altogether. UE 115-a may attempt various error recovery techniques to recover data that may be lost during a broadcast/multicast transmission. For example, UE 115-a may transmit HARQ feedback to base station 105-a to notify the base station 105-a of an error in receipt of the transmission (e.g., NACK), or to acknowledge successful receipt of a transmission (e.g., ACK). The base station 105-a may use HARQ feedback it receives to determine whether to retransmit the downlink data. For example, the retransmission may be triggered when the base station 105-b receives a NACK by one or multiple UEs in the network (e.g., the retransmission may be triggered by a HARQ process).

In the example of an SFN, the base station 105-a may retransmit the data as requested by UE 115-a as a broadcast/multicast transmission to each of the UEs 115. Because the base station 105-a transmits to each of the UEs 115 (e.g., not just to UE 115-a) in the broadcast transmission, base station 105-a may determine whether to retransmit the data based on various factors such as a threshold error rate or a number of NACKs received from UEs in the network. In some other cases, base station 105-a may autonomously send a retransmission to UE 115-a, and UE 115-a may be configured to expect a retransmission from base station 105-a (e.g., UE 115-a may be configured to receive the same information from broadcast transmissions multiple times). In such autonomous retransmissions, the transmission beams used in later retransmissions may be the same as the beams used for the first transmission of the data.

In some cases, signals transmitted to UE 115-a from a base station or multiple base stations in the SFN may suffer from interference (e.g., channels at allocated tones for the SFN may experience poor communications quality). For example, UE 115-a may communicate with base station 105-a, and may receive interference associated with other base stations in the network (e.g., the sum of channels from neighboring base stations may interfere and cause decreased communications quality). In some other examples, selfinterference of the network may occur due to transmission delays from different base stations in the network broadcasting a message to the UE 115-*a*. In such cases, the UE 115-*a* may not request a retransmission of a signal, because the retransmission may encounter similar challenges as the original transmission (e.g., the retransmission may encounter similar interference from simultaneously transmitting base stations in the SFN).

To improve signal quality associated with broadcast transmissions in the SFN, a number of different techniques may be applied to reduce interference effects for retransmissions transmitted to UE 115-*a*. In some cases, the techniques may allow for the SFN channel to have differing frequencies from tone to tone in the SFN. In one example, a base station 105 may apply frequency hopping to retransmissions in the SFN (e.g., a base station 105 may change the frequency of tones used to transmit the retransmission). In another example, the base station 105 may apply cyclic diversity delay techniques to retransmissions, where the base station 105 may apply different cyclic delays to different retransmissions. In addition, different base stations may apply different cyclic delays to retransmissions to reduce interference in the SFN. The base station 105 may transmit the retransmission of the broadcast message, and the SFN may have increased transmission diversity and reduced interference effects based on the techniques described herein.

Figure 3:
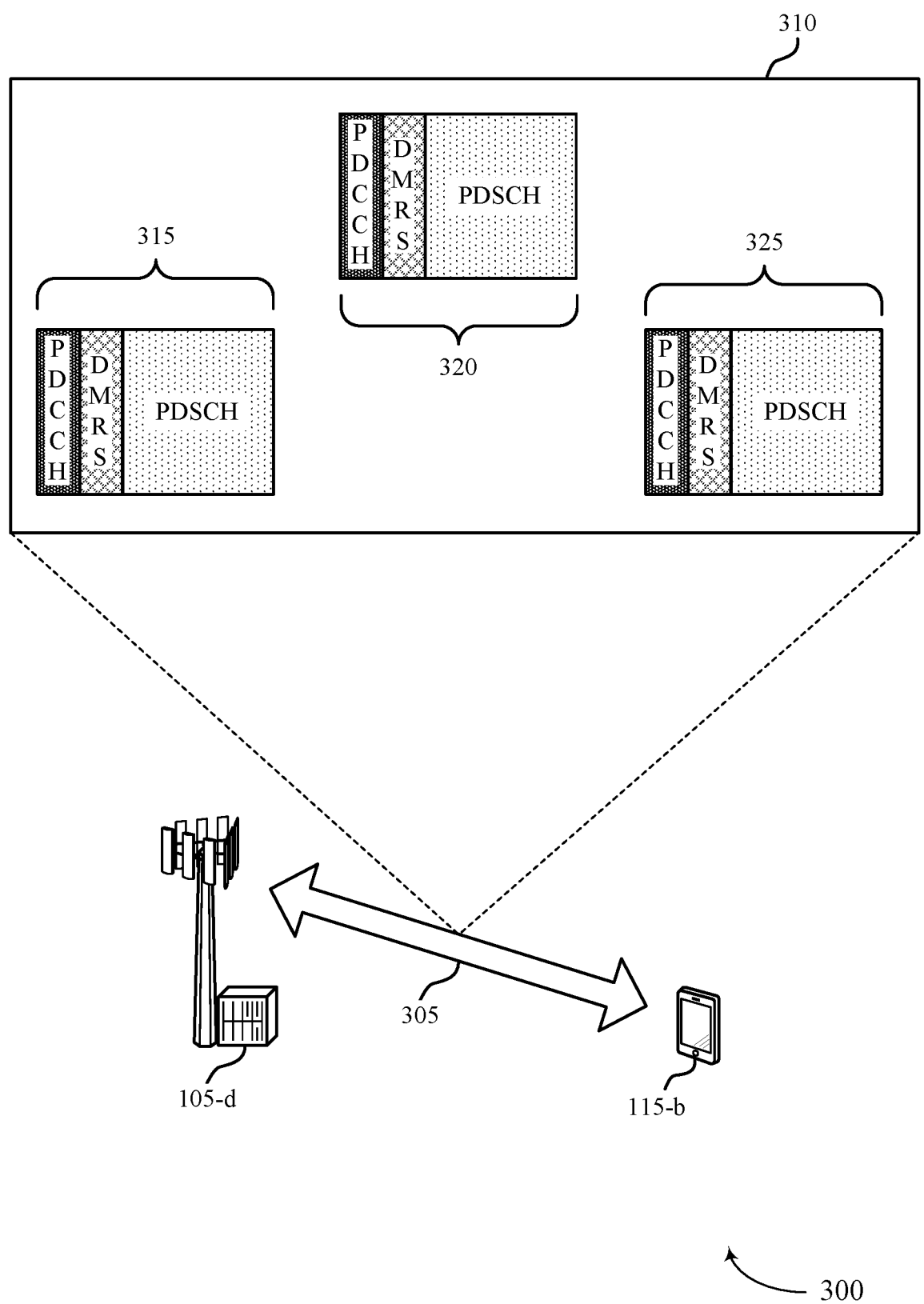
FIG. 3 illustrates an example of a frequency hopping configuration that supports frequency diversity techniques for single frequency networks in accordance with aspects of the present disclosure.

FIG. 3 illustrates an example of a frequency hopping configuration 300 that supports frequency diversity techniques for single frequency networks in accordance with aspects of the present disclosure. In some examples, frequency hopping configuration 300 may implement aspects of wireless communications system 100. The frequency hopping configuration 300 may include a base station 105-*d* along and a UE 115-*b*, which may be examples of a base station 105 and a UE 115 as described with reference to FIGS. 1 and 2.

A base station 105-*d* and a UE 115-*b* may communicate using communication link 305 in using an SFN channel. In some cases, communication link 305 may be an example of a broadcast or multicast channel connection in the SFN. Base station 105-*d* may transmit a broadcast message (e.g., data) to the UE 115-*b* over communication link 305. In some cases, the UE 115-*b* may fail to receive the broadcast message from the base station 105-*d*, the transmission of the broadcast message may experience interference from other transmissions, or the broadcast message may otherwise not be received by the UE 115-*b*. In such cases, the UE 115-*b* may transmit a NACK to the base station 105-*d* to notify the base station 105-*d* of the failed receipt of the broadcast message. In some cases, receiving the NACK may trigger the base station 105-*d* to retransmit the broadcast message in a retransmission. In some other cases, the base station 105-*d* may automatically retransmit the broadcast message, and the UE 115-*b* may be configured to receive multiple transmissions of the broadcast message from the base station 105-*d*. In some cases (e.g., in cases of automatic retransmission), the transmission and the retransmission of the broadcast message may not be adjacent in time.

In accordance with frequency hopping configuration 300, the base station 105-*d* may use a frequency hopping pattern 310 to reduce interference and increase frequency diversity for retransmissions in the SFN. The base station 105-*d* may transmit an indication of the frequency hopping pattern 310 to the UE 115-*b* to indicate different frequency allocations for different retransmissions of the broadcast message. For example, the frequency hopping pattern may be implemented by using different tones for the SFN at different times. The base station 105-*d* may allocate a first set of tones for transmitting the broadcast message and may allocate a different set of tones for transmitting the retransmission of the broadcast message. In addition, the base station 105-*d* may use directional beamforming, and may transmit multiple different frequencies on the same beam, or may transmit using different frequencies on multiple different beams.

In some examples, the base station 105-*d* may indicate a frequency hopping pattern including a number of resource allocations 315, 320, and 325 for transmitting retransmissions. Each resource allocation may include a physical downlink control channel (PDCCH) and demodulation reference signal (DMRS) which schedule the physical downlink shared channel (PDSCH) using different tones for the retransmission. The base station 105-*d* may transmit a single retransmission or multiple retransmissions based on the hopping pattern it may determine to use. In addition, the indication of the frequency hopping pattern may be conveyed to the UE 115-*c* using dynamic signaling, semi-static signaling, or a combination thereof. In some other cases, the indication of the frequency hopping pattern may be known by the UE 115-*b* (e.g., according to predefined rules).

Figure 4:
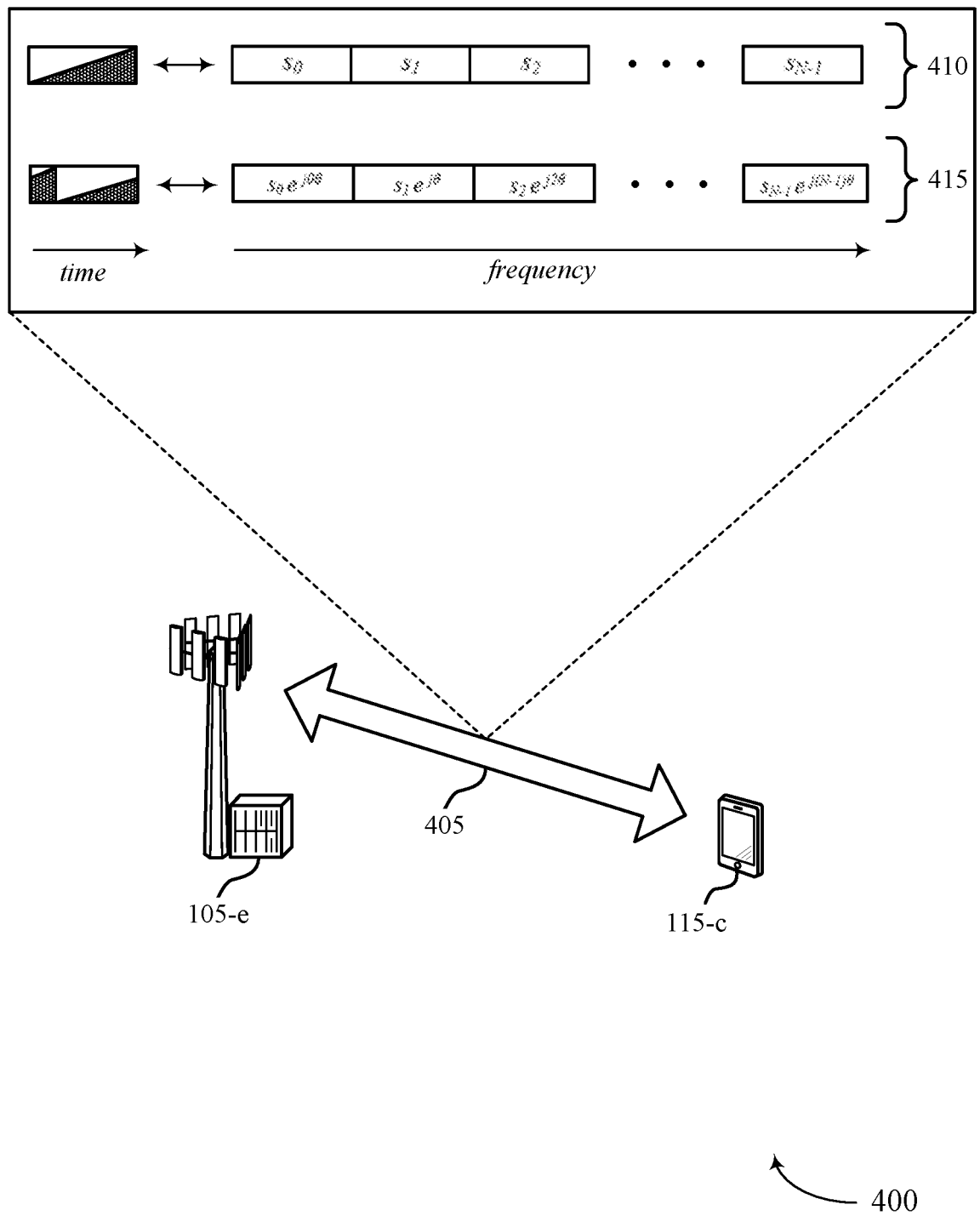
FIG. 4 illustrates an example of a cyclic diversity delay (CDD) configuration that supports frequency diversity techniques for single frequency networks in accordance with aspects of the present disclosure.

FIG. 4 illustrates an example of a CDD configuration 400 that supports frequency diversity techniques for single frequency networks in accordance with aspects of the present disclosure. In some examples, CDD configuration 400 may implement aspects of wireless communications system 100. The CCD configuration 400 may include a base station 105-*e* and UE 115-*c*, which may be examples of a base station 105 and a UE 115 as described with reference to FIGS. 1-3.

A base station 105-*e* and a UE 115-*c* may communicate using communication link 405 in an SFN. In some cases, the base station 105-*e* and UE 115-*c* may utilize a broadcast or multicast channel connection in the SFN. Base station 105-*e* may transmit a broadcast message to the UE 115-*c* using communication link 405. In some cases, the UE 115-*c* may fail to receive the broadcast message from the base station 105-*e*, the broadcast message may experience interference from other transmissions in the SFN (e.g., from other base stations transmitting the broadcast message), or the broadcast message may otherwise not be received by the UE 115-*c*. In such cases, the UE 115-*c* may transmit a NACK to the base station 105-*e* to notify the base station of the failed receipt of the broadcast message. In some cases, receiving the NACK may trigger the base station 105-*e* to retransmit the broadcast message in a retransmission. In some other cases, the base station 105-*e* may automatically retransmit the broadcast message, and the UE 115-*c* may be configured to receive multiple transmissions of the broadcast message from the base station 105-*e*.

In accordance with CDD configuration 400, the base station 105-*e* may use CDD techniques to reduce interference and increase transmission diversity for retransmissions of a broadcast message. In some cases, the base station 105-*e* may apply CDD in a way that is transparent to the UE 115-*c* (e.g., the base station 105-*e* may apply CDD without notifying the UE 115-*c* of the CDD). In some other cases, the UE 115-*c* may identify different CDD values based on signaling from the base station 105-*e*, or the different CDD values defined by the base station 105-*e* may be predefined. In yet other cases, the UE 115-*c* may request application of CDD (e.g., as part of UE NACK transmission, etc.).

In some cases, a CDD technique may include transmitting a broadcast message using a first antenna, adding a phase delay (e.g., CDD) to the broadcast message at a second antenna (or adding multiple phase delays to multiple retransmissions of the broadcast message), and retransmitting the broadcast message according to the phase delay. Different phase delays may be associated with different OFDM tones at a number of antenna ports of base station 105-*e*.

In one example, the base station 105-*e* may apply a CDD to a broadcast message in the time domain, which may correspond to a cyclically shifted version of the broadcast message in the frequency domain. In the frequency domain, each tone in each antenna port of base station 105-*e* may be multiplexed with different phase rotations. The equivalent channel at each tone may therefore be different as received by UE 115-*c* based on the different phase rotations applied (e.g., UE 115-*c* may receive the broadcast message according to the different phase rotations and different apparent frequencies, even if the raw tone channel without CDD remains the same from tone to tone).

The base station 105-*e* may transmit a first broadcast message 410, which may be represented by a signal in the time domain, and corresponding symbols $s_0$ through $s_{N-1}$ in the frequency domain which may be associated with a first frequency configuration. The base station 105-*e* may then transmit a second message 415 (e.g., a retransmission of the first message 410), which may be represented by a cyclically shifted signal in the time domain, and corresponding symbols $s_0\ e^{j0\theta}$ through $s_{N-1}\ e^{j(N-1)\theta}$ in the frequency domain, which may be associated with a second frequency configuration. The cyclic shift in the time domain may correspond to the phase shift (e.g., $e^{j(N-1)\theta}$) for each symbol in the frequency domain, which may increase frequency diversity for the transmissions from the base station 105-*e*.

In some cases, the time domain aspects of transmission 410 and 415 may correspond to different layers (e.g., multi-layer cases), where the payloads of broadcast messages 410 and 415 may be cyclically shifted versions of one another. In some multi-layer data cases, the base station 105-*e* may add a different precoder for different tones. For example, each input layer may have different phase shifts at different tones, and the base station 105-*e* may apply a common precoding matrix. During the precoding process, a number of data streams from a layer mapper may be precoded to distribute the data stream to an antenna port of the base station 105-*e* (e.g., using a precoding matrix). In the case of applying CDD, the base station 105-*e* may multiply the original precoding matrix by one or more additional matrices which may apply a phase shift, distribute energy among data layers, etc.

In some other cases, base station 105-*e* may be part of group of base stations 105 in the SFN. In some cases, the base stations 105 may participate in coordinated multipoint communications with the UE 115-*c*. In such cases, the base stations 105 may apply CDD techniques for transmitting retransmissions to the UE 115-*c*. For example, different cyclic delay values may be applied for different retransmissions at different antenna ports for each of the base stations. In such examples, different antenna ports and/or different cyclic delays may be used at different base stations, or different cyclic delays may be used for multiple antenna ports at a single base station.

In some other examples, a UE 115 may receive retransmissions from multiple different TRPs associated with a base station or multiple base stations, and the UE 115 may combine the received signals from different TRPs or base stations together. In such examples, TRPs may transmit the data according to different cyclic delay values, and the UE 115 may receive the data from the TRPs using one or more directional beams. In some cases, different base stations or different TRPs may apply different delays such that the cyclic delay values may vary among retransmissions and may also vary among base stations or TRPs. For example, in some networks, a first base station may apply a first set of cyclic diversity delay values (e.g., delay 0, delay 1), a second base station may apply a second set of cyclic diversity delay values (e.g., delay 2, delay 3) different from the first set of delay values, and a third base station may apply a third set of cyclic diversity delay values (e.g., delay 4, delay 5) different from the second set of delay values.

Figure 5:
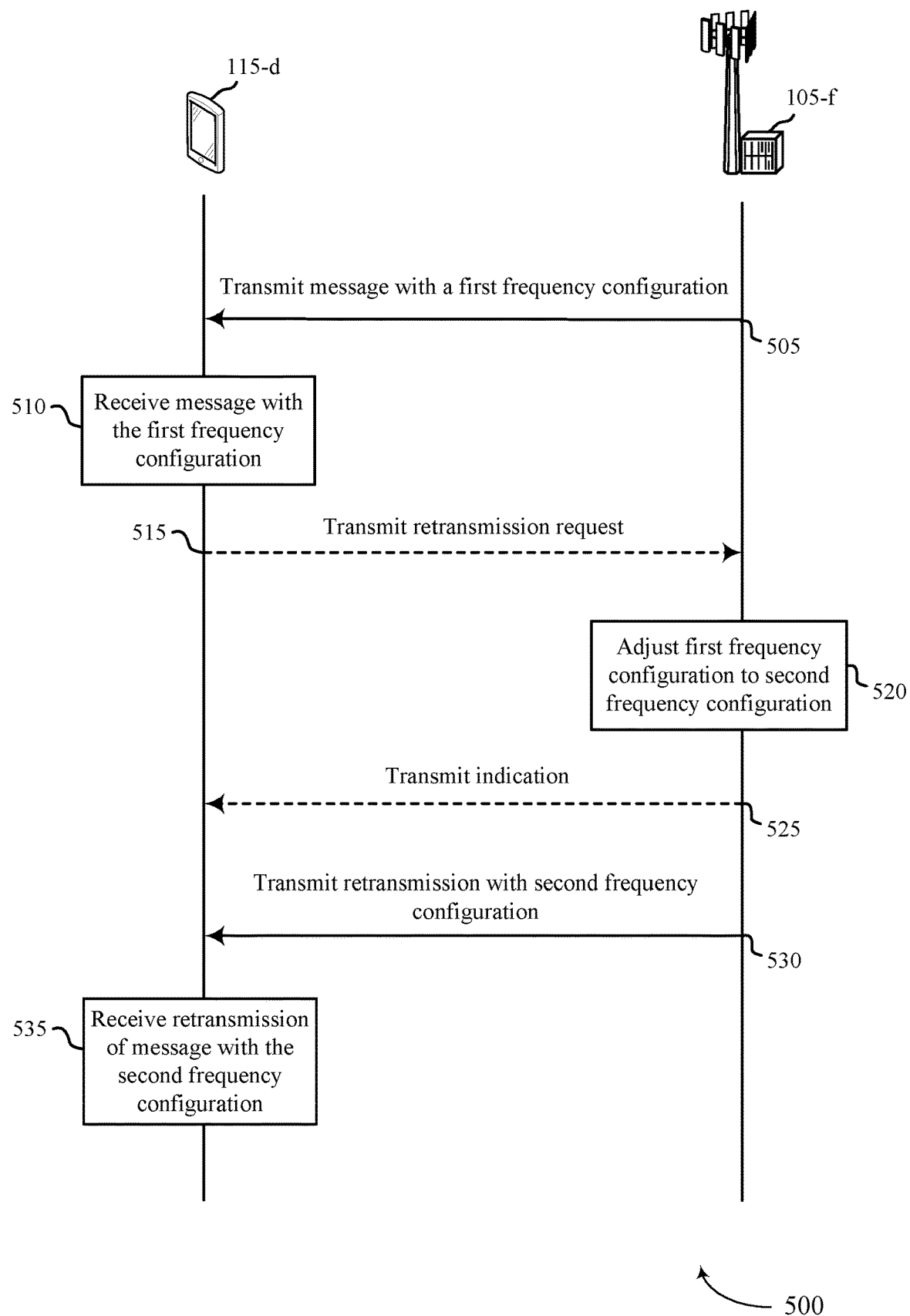
FIG. 5 illustrates an example of a process flow diagram that supports frequency diversity techniques for single frequency networks in accordance with aspects of the present disclosure.

FIG. 5 illustrates an example of a process flow diagram 500 that supports frequency diversity techniques for single frequency networks in accordance with aspects of the present disclosure. In some examples, process flow diagram 500 may implement aspects of wireless communications system 100. Process flow diagram 500 may include a base station 105-*f* and a UE 115-*d*, which may be examples of a base station 105 and a UE 115 as described with reference to FIGS. 1-4.

At 505, base station 105-*f* may transmit a message with a first frequency configuration over an SFN channel using a directional beam. In some cases, the message may be a broadcast message, and the SFN channel may be a multimedia broadcast SFN channel.

At 510, the UE 115-*d* may receive the message with a first frequency configuration over the SFN channel using a directional beam. In some cases, the UE 115-*d* may fail to receive the message or may improperly receive the message from the base station 105-*f*.

At 515, the UE 115-*d* may transmit a retransmission request to the base station 105-*f*, and the base station 105-*f* may receive the retransmission request from the UE 115-*d*, which may request retransmission of the message from the base station 105-*f*. For example, the UE 115-*d* may transmit a NACK associated with a failed receipt of the message. In some cases, the NACK may include the retransmission request. In some other cases, the base station may determine to retransmit the message automatically (e.g., without receiving a retransmission request or NACK from the UE 115-*d*). In such cases, the UE 115-*d* may be configured to receive one or more retransmissions from the base station 105-*f*.

At 520, the base station may adjust the first frequency configuration to a second frequency configuration. In one example, adjusting the first frequency configuration may include applying a frequency hopping pattern to the retransmission of the message. In such examples, adjusting the first frequency configuration to a second frequency configuration according to the frequency hopping pattern may include the first frequency configuration containing a first set of tones allocated for the message, and the second frequency configuration including a second set of tones allocated for the retransmission of the message (e.g., where the first set of tones are different from the second set of tones).

In another example, adjusting the first frequency configuration may include applying a CDD to the retransmission of the message. In some cases, the base station 105-*f* may receive a request from the UE 115-*d* to apply a CDD to the retransmission.

In examples where the base station 105-*f* applies a CDD, the base station 105-*f* may transmit the message using a first antenna and may apply a first phase delay to at least a portion of the message at a second antenna. Then, the base station 105-*f* may transmit the retransmission of the message based on applying the first phase delay.

At 525, the base station 105-*f* may transmit an indication of the frequency hopping pattern to the UE 115-*d*, and the UE 115-*d* may receive the indication. Additionally or alternatively, the base station 105-*f* may transmit an indication of the CDD to the UE 115-*d*, and the UE 115-*d* may receive the indication.

At 530, the base station 105-*f* may transmit a retransmission of the message with the second frequency configuration over the SFN. In some cases, the base station 105-*f* may transmit the retransmission of the message upon expiration of a gap after transmitting the message (e.g., the transmission and the retransmission may not be adjacent in time).

In some other examples, the base station 105-*f* may retransmit multiple retransmissions of the message to UE 115-*d*. For example, the base station may apply a second cyclic diversity delay (e.g., phase delay) to the second retransmission, where the second cyclic diversity delay is different from the first cyclic diversity delay used for the first retransmission of the message.

At 535, the UE 115-*d* may receive the retransmission of the message with the second frequency configuration over the SFN channel. In some cases, the UE 115-*d* may receive the retransmission of the message according to a frequency hopping pattern, where at least the second frequency configuration is based at least in part on the frequency hopping pattern.

In some cases, the UE 115-*d* may receive the retransmission of the message from a first node according to a first CDD, where the second frequency configuration is based on first CDD. The UE 115-*d* may further receive a second retransmission of the message from the first node according to a second CDD that is different than the first CDD. In addition, the UE 115-*d* may receive a retransmission of the message from a second node according to a third CDD that is different from the first CDD.

Figure 6:
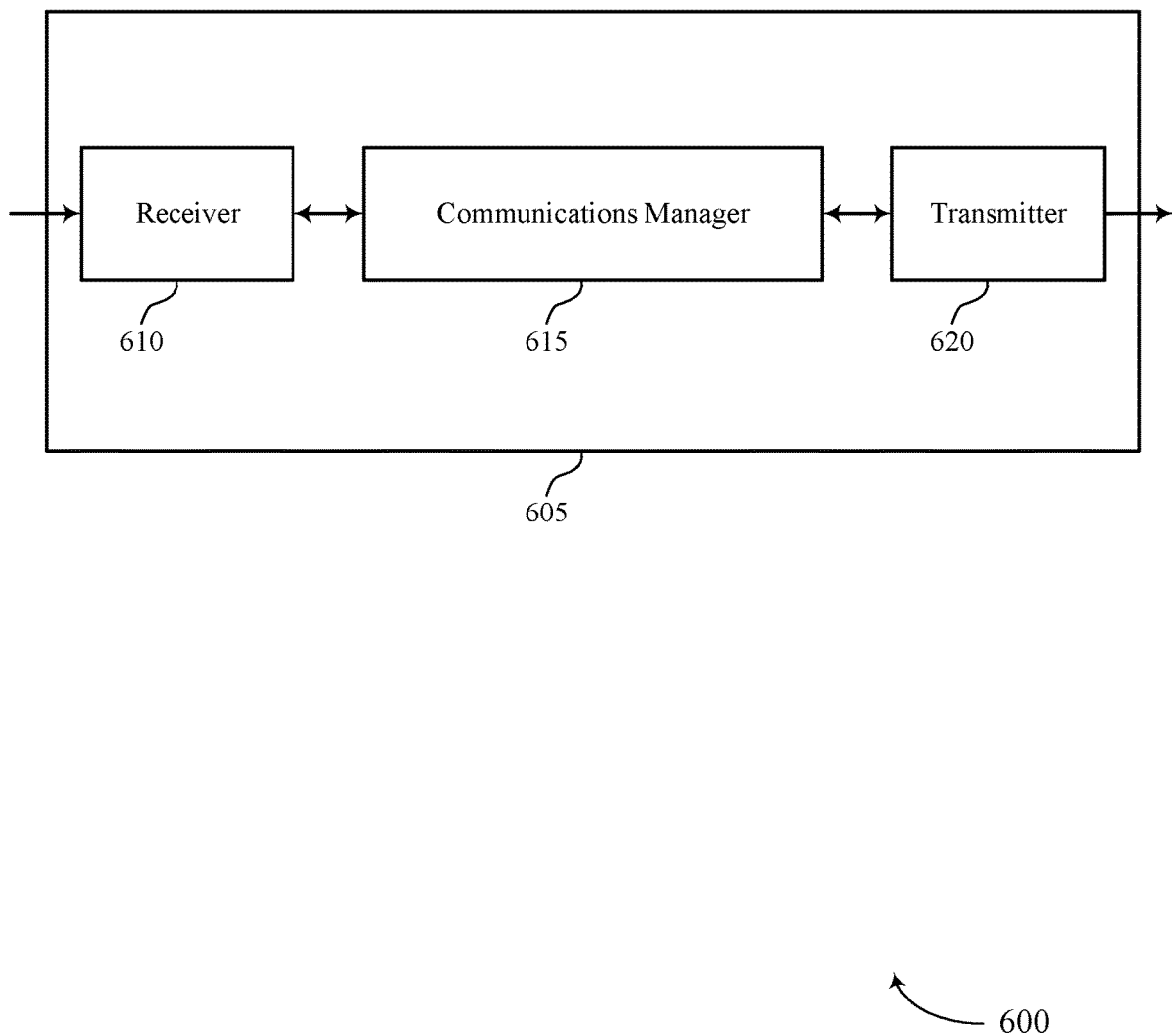
FIGS. 6 and 7 show block diagrams of devices that support frequency diversity techniques for single frequency networks in accordance with aspects of the present disclosure.

FIG. 6 shows a block diagram 600 of a device 605 that supports frequency diversity techniques for single frequency networks in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to frequency diversity techniques for single frequency networks, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a message with a first frequency configuration over a single frequency network channel using a directional beam and receive a retransmission of the message with a second frequency configuration over the single frequency network channel. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
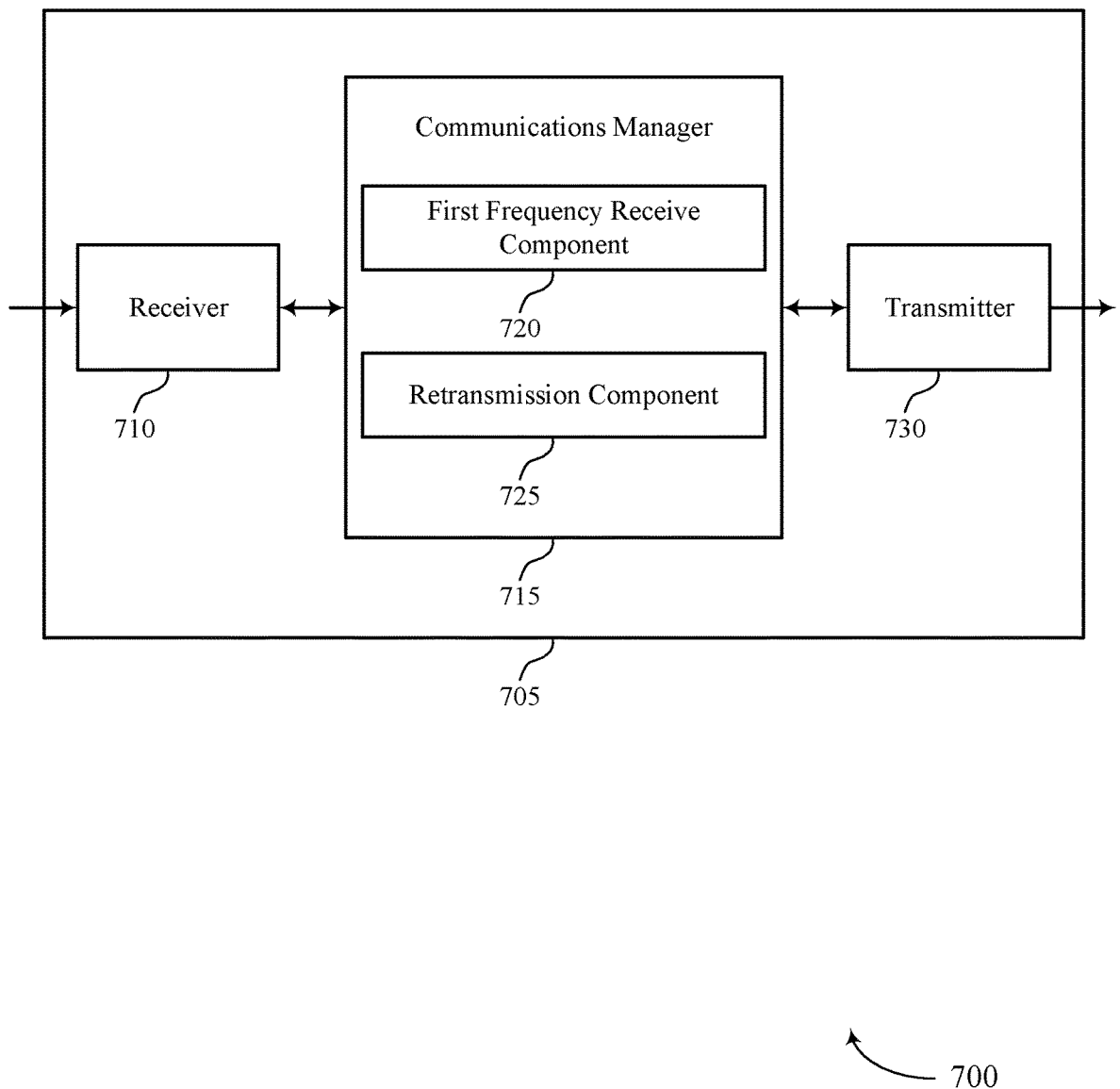

FIG. 7 shows a block diagram 700 of a device 705 that supports frequency diversity techniques for single frequency networks in accordance with aspects of the present disclosure. The device 705 may be an example of aspects of a device 605, or a UE 115 as described herein. The device 705 may include a receiver 710, a communications manager 715, and a transmitter 730. The device 705 may also include a processor. Each of these components may be in communication with one another (e.g., via one or more buses).

The receiver 710 may receive information such as packets, user data, or control information associated with various information channels (e.g., control channels, data channels, and information related to frequency diversity techniques for single frequency networks, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a first frequency transmit component 720 and a retransmission component 725. The communications manager 715 may be an example of aspects of the communications manager 910 described herein.

The first frequency receive component 720 may receive a message with a first frequency configuration over a single frequency network channel using a directional beam. The retransmission component 725 may receive a retransmission of the message with a second frequency configuration over the single frequency network channel.

The transmitter 730 may transmit signals generated by other components of the device 705. In some examples, the transmitter 730 may be collocated with a receiver 710 in a transceiver module. For example, the transmitter 730 may be an example of aspects of the transceiver 920 described with reference to FIG. 9. The transmitter 730 may utilize a single antenna or a set of antennas.

In some examples, communications manager 715 may be implemented as an integrated circuit or chipset for a mobile device modem, and the receiver 710 and transmitter 720 may be implemented as analog components (e.g., amplifiers, filters, antennas, etc.) coupled with the mobile device modem to enable wireless transmission and reception.

The communications manager 715 as described herein may be implemented to realize one or more potential advantages. Various implementations may enable mitigation of interference (e.g., interference caused by one or more broadcasting base stations or TRPs) along a received signal space of device 705 that the comprises communications manager 715. At least one implementation may enable the communications manager 715 to effectively apply various frequency diversity techniques such as frequency hopping and CDD. At least one implementation may enable communications manager 715 to effectively reduce noise and interference of broadcast and/or multicast transmissions at the device 705.

Based on implementing the frequency diversity techniques as described herein, one or more processors of the device 705 (e.g., processor(s) controlling or incorporated with one or more of receiver 710, communications manager 715, and transmitter 720) may reduce an amount of time required to effectively decode data streams transmitted from multiple serving base stations or TRPs, and may reduce the interference and signal noise from the broadcast transmissions. Such techniques may improve overall communications quality within the network.

Figure 8:
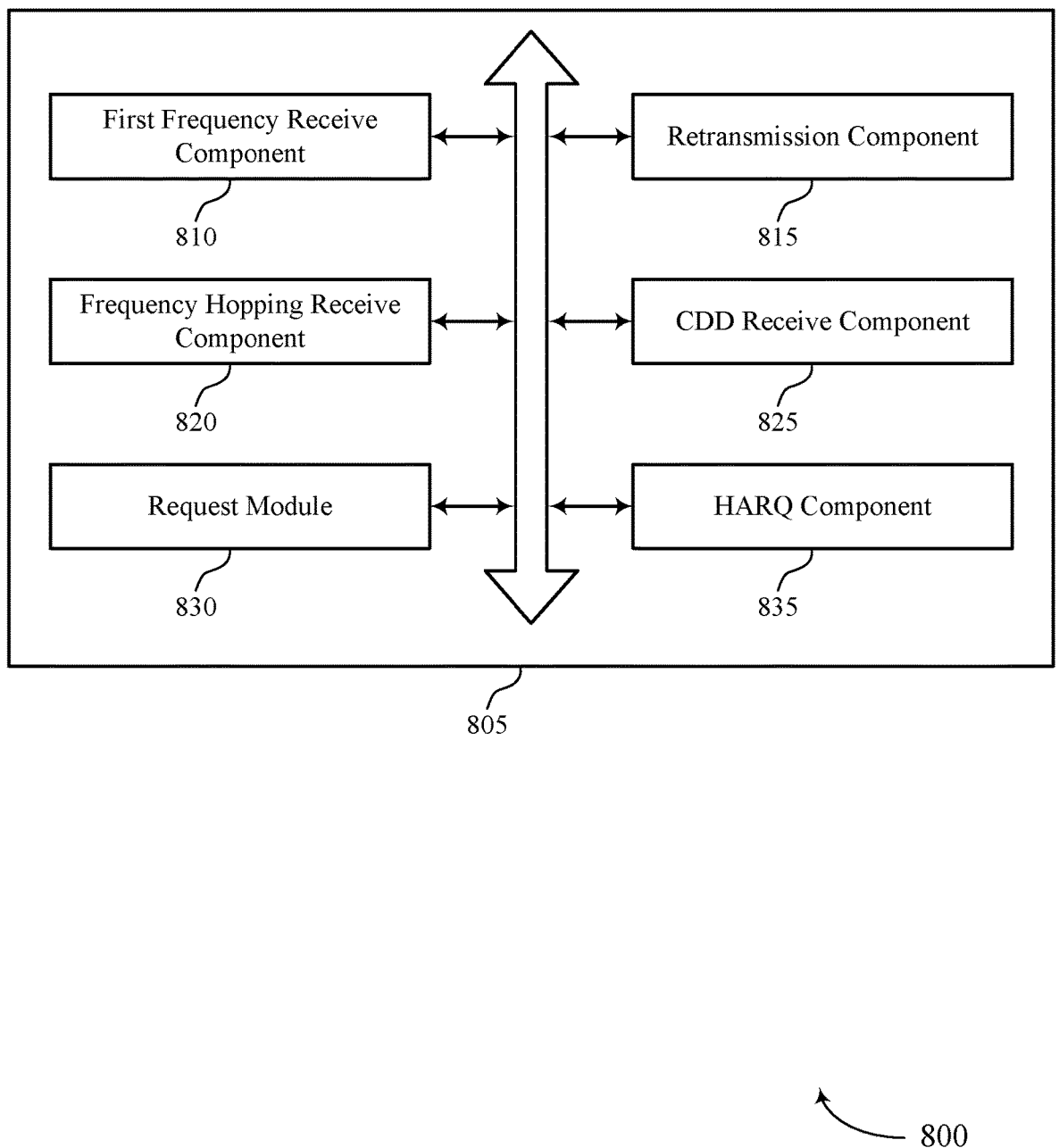
FIG. 8 shows a block diagram of a communications manager that supports frequency diversity techniques for single frequency networks in accordance with aspects of the present disclosure.

FIG. 8 shows a block diagram 800 of a communications manager 805 that supports frequency diversity techniques for single frequency networks in accordance with aspects of the present disclosure. The communications manager 805 may be an example of aspects of a communications manager 615, a communications manager 715, or a communications manager 910 described herein. The communications manager 805 may include a first frequency receive component 810, a retransmission component 815, a frequency hopping receive component 820, a CDD receive component 825, a request module 830, and a HARQ component 835. Each of these modules may communicate, directly or indirectly, with one another (e.g., via one or more buses).

The first frequency receive component 810 may receive a message with a first frequency configuration over a single frequency network channel using a directional beam.

The HARQ component 835 may transmit a negative acknowledgement associated with the message.

The retransmission component 815 may receive a retransmission of the message with a second frequency configuration over the single frequency network channel. In some examples, the retransmission component 815 may receive the retransmission of the message upon expiration of a gap after receiving the message.

In some examples, the frequency hopping receive component 820 may receive an indication of the frequency hopping pattern. The frequency hopping receive component 820 may receive the retransmission of the message according to a frequency hopping pattern, where at least the second frequency configuration is based on the frequency hopping pattern.

The request module 830 may transmit a request to a base station to apply a cyclic diversity delay.

In some examples, the CDD receive component 825 may receive an indication of the cyclic diversity delay. The CDD receive component 825 may receive the retransmission of the message from a first node according to a first cyclic diversity delay, where at least the second frequency configuration is based on the first cyclic diversity delay.

In some examples, the CDD receive component 825 may receive a second retransmission of the message from the first node based on a second cyclic diversity delay that is different than the first cyclic diversity delay. In some examples, the CDD receive component 825 may receive a retransmission of the message from a second node according to a third cyclic diversity delay that is different from the first cyclic diversity delay.

Figure 9:
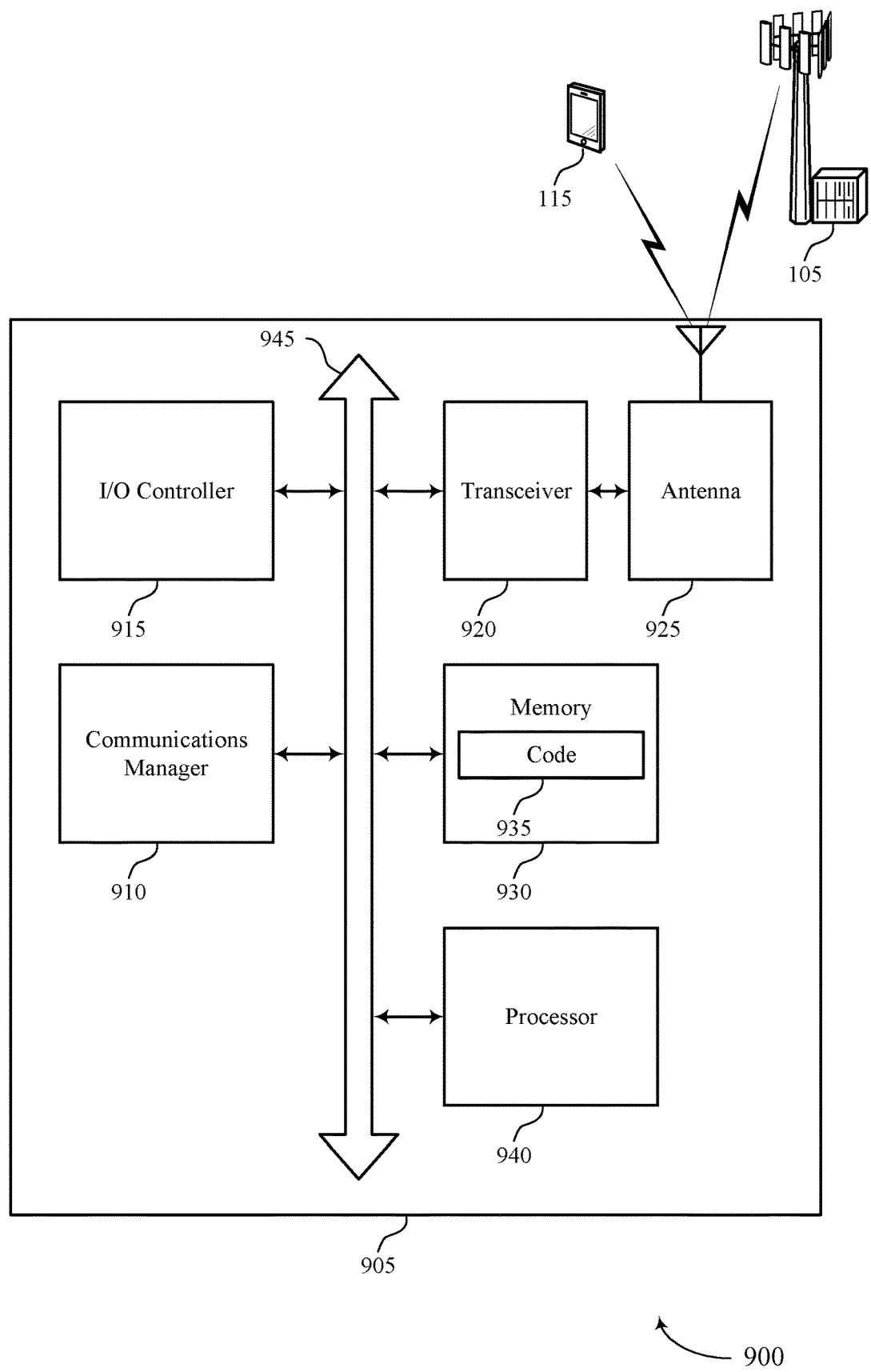
FIG. 9 shows a diagram of a system including a device that supports frequency diversity techniques for single frequency networks in accordance with aspects of the present disclosure.

FIG. 9 shows a diagram of a system 900 including a device 905 that supports frequency diversity techniques for single frequency networks in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a message with a first frequency configuration over a single frequency network channel using a directional beam and receive a retransmission of the message with a second frequency configuration over the single frequency network channel.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting frequency diversity techniques for single frequency networks).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
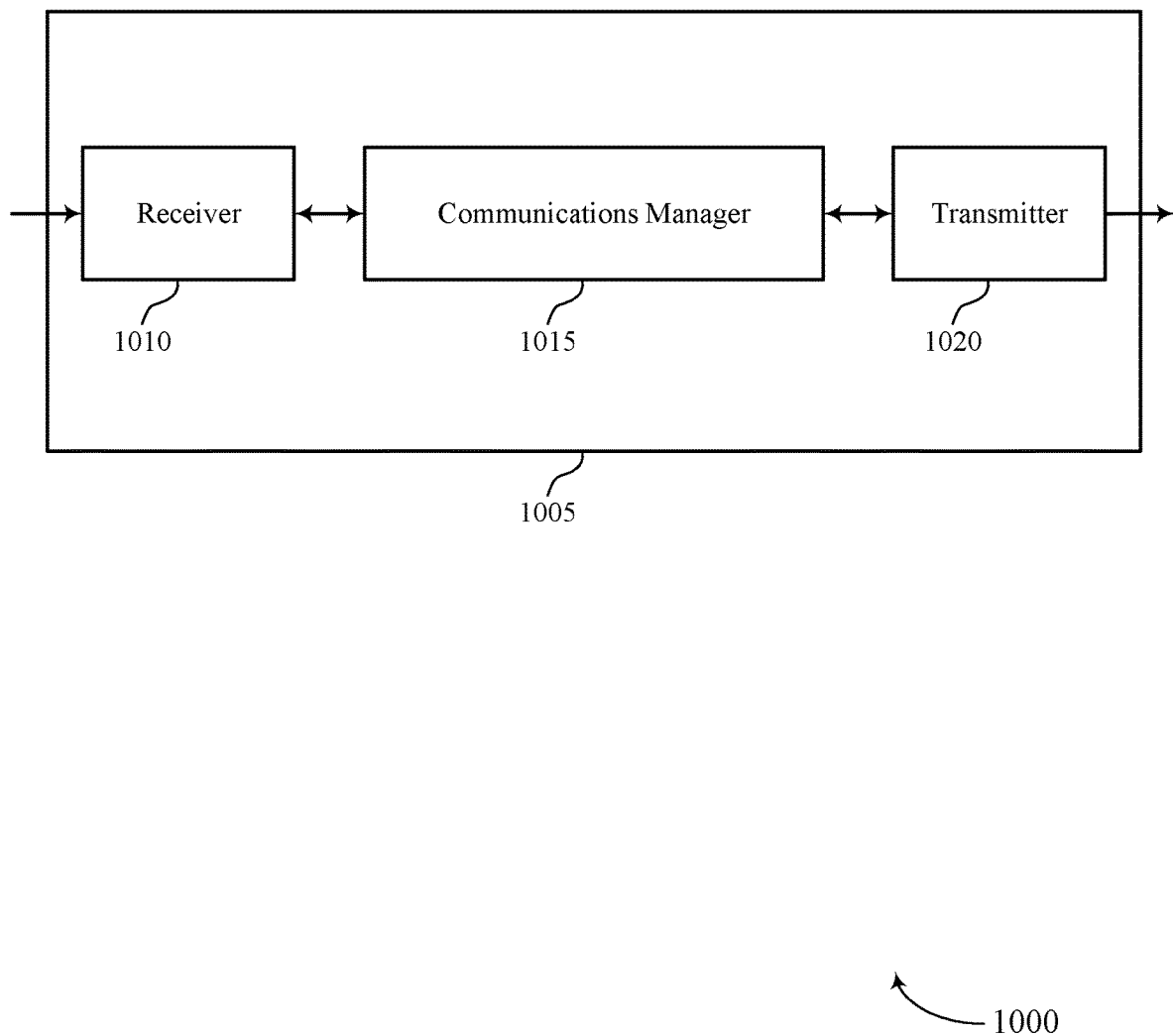
FIGS. 10 and 11 show block diagrams of devices that support frequency diversity techniques for single frequency networks in accordance with aspects of the present disclosure.

FIG. 10 shows a block diagram 1000 of a device 1005 that supports frequency diversity techniques for single frequency networks in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to frequency diversity techniques for single frequency networks, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a message with a first frequency configuration over a single frequency network channel using a directional beam, adjust the first frequency configuration to a second frequency configuration different from the first frequency configuration, and transmit a retransmission of the message with the second frequency configuration over the single frequency network channel. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
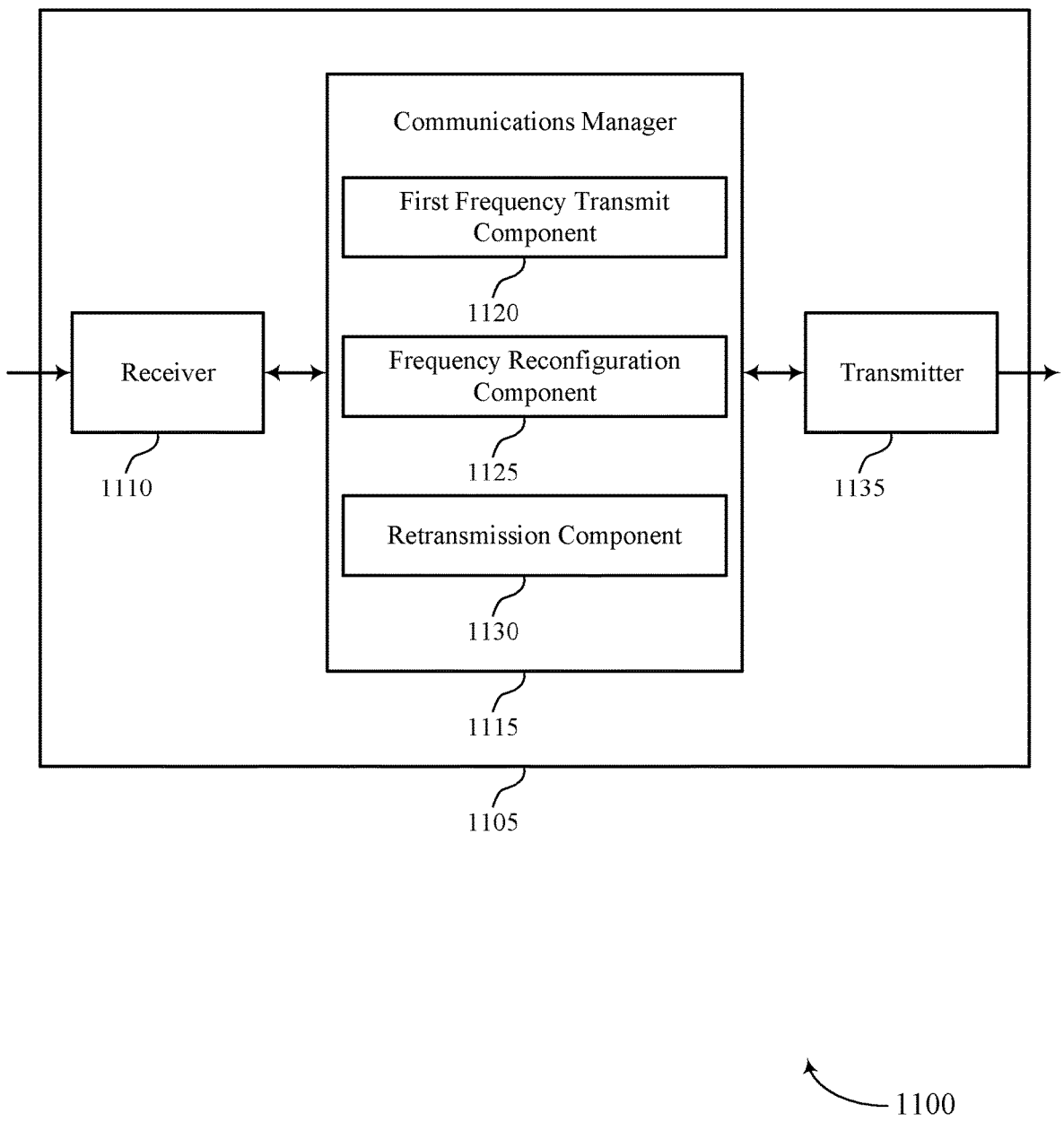

FIG. 11 shows a block diagram 1100 of a device 1105 that supports frequency diversity techniques for single frequency networks in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to frequency diversity techniques for single frequency networks, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a first frequency transmit component 1120, a frequency reconfiguration component 1125, and a retransmission component 1130. The communications manager 1115 may be an example of aspects of the communications manager 1310 described herein.

The first frequency transmit component 1120 may transmit a message with a first frequency configuration over a single frequency network channel using a directional beam.

The frequency reconfiguration component 1125 may adjust the first frequency configuration to a second frequency configuration different from the first frequency configuration.

The retransmission component 1130 may transmit a retransmission of the message with the second frequency configuration over the single frequency network channel.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
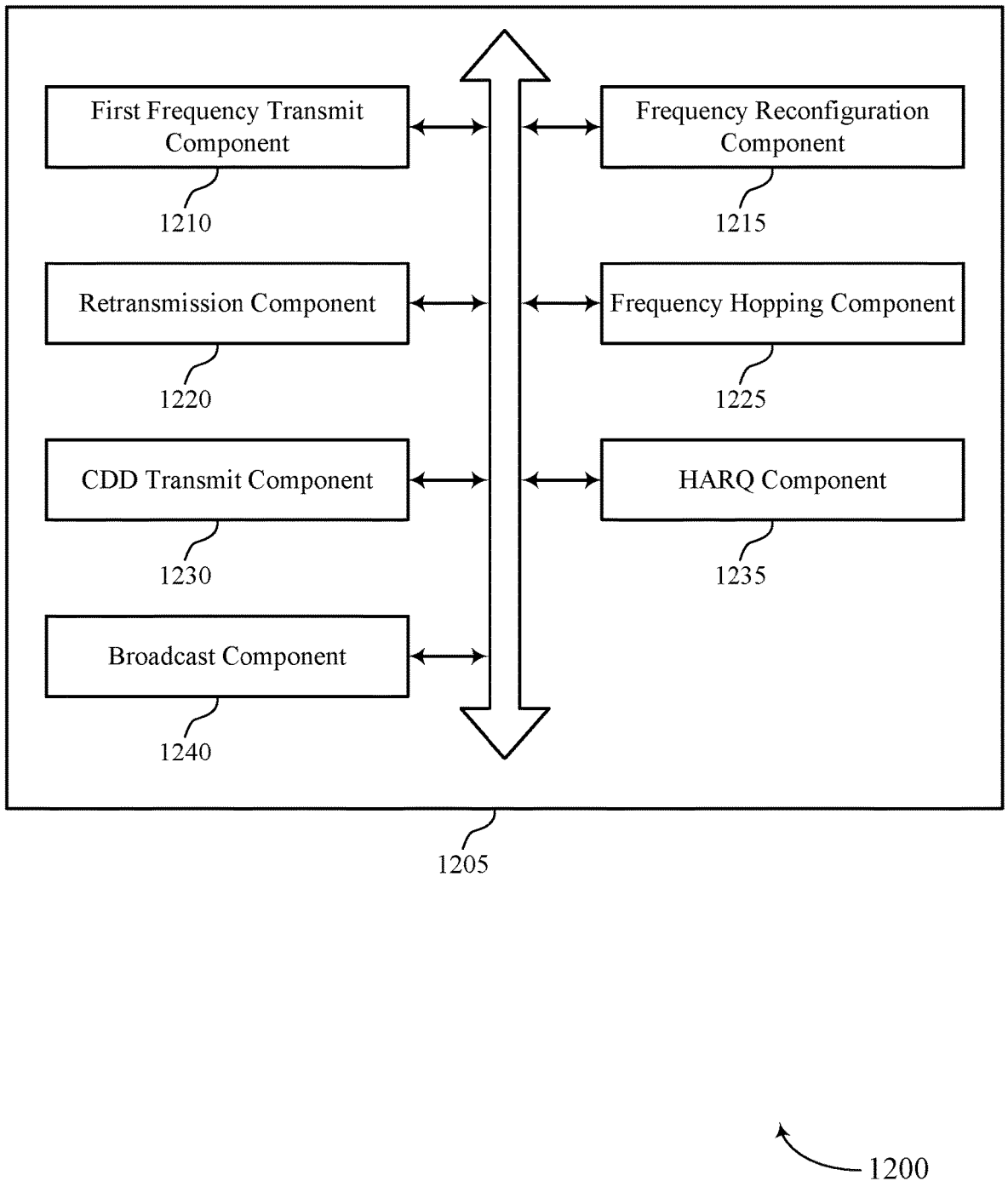
FIG. 12 shows a block diagram of a communications manager that supports frequency diversity techniques for single frequency networks in accordance with aspects of the present disclosure.

FIG. 12 shows a block diagram 1200 of a communications manager 1205 that supports frequency diversity techniques for single frequency networks in accordance with aspects of the present disclosure. The communications manager 1205 may be an example of aspects of a communications manager 1015, a communications manager 1115, or a communications manager 1310 described herein. The communications manager 1205 may include a first frequency transmit component 1210, a frequency reconfiguration component 1215, a retransmission component 1220, a frequency hopping component 1225, a CDD transmit component 1230, a HARQ component 1235, and a broadcast component 1240. Each of these modules may communicate, directly or indirectly, with one another (e.g., via one or more buses).

The first frequency transmit component 1210 may transmit a message with a first frequency configuration over a single frequency network channel using a directional beam.

The HARQ component 1235 may receive a negative acknowledgement associated with the message, where transmitting the retransmission of the message is based on receiving the negative acknowledgement.

The frequency reconfiguration component 1215 may adjust the first frequency configuration to a second frequency configuration different from the first frequency configuration.

In some examples, the frequency hopping component 1225 may transmit an indication of the frequency hopping pattern. The frequency hopping component 1225 may apply a frequency hopping pattern to the retransmission of the message.

In some cases, the first frequency configuration includes a first set of tones allocated for the message and the second frequency configuration includes a second set of tones allocated for the retransmission of the message that are different than the first set of tones.

In some examples, the CDD transmit component 1230 may transmit an indication of the cyclic diversity delay. In some examples, the CDD transmit component 1230 may receive a request from a UE to apply the cyclic diversity delay. The CDD transmit component 1230 may apply a cyclic diversity delay to the retransmission of the message. In some examples, the CDD transmit component 1230 may transmit the message using a first antenna. In some examples, the CDD transmit component 1230 may apply a first phase delay to at least a portion of the message at a second antenna.

In some examples, the CDD transmit component 1230 may transmit the retransmission of the message based on the first phase delay. In some examples, the CDD transmit component 1230 may transmit a second retransmission of the message based on a second phase delay that is different than the first phase delay.

The retransmission component 1220 may transmit a retransmission of the message with the second frequency configuration over the single frequency network channel.

In some examples, the retransmission component 1220 may transmit the retransmission of the message upon expiration of a gap after transmitting the message. In some cases, the retransmission is transmitted automatically.

The broadcast component 1240 may indicate the message as a broadcast message. In some cases, the single frequency network channel includes a multimedia broadcast single frequency network channel.

Figure 13:
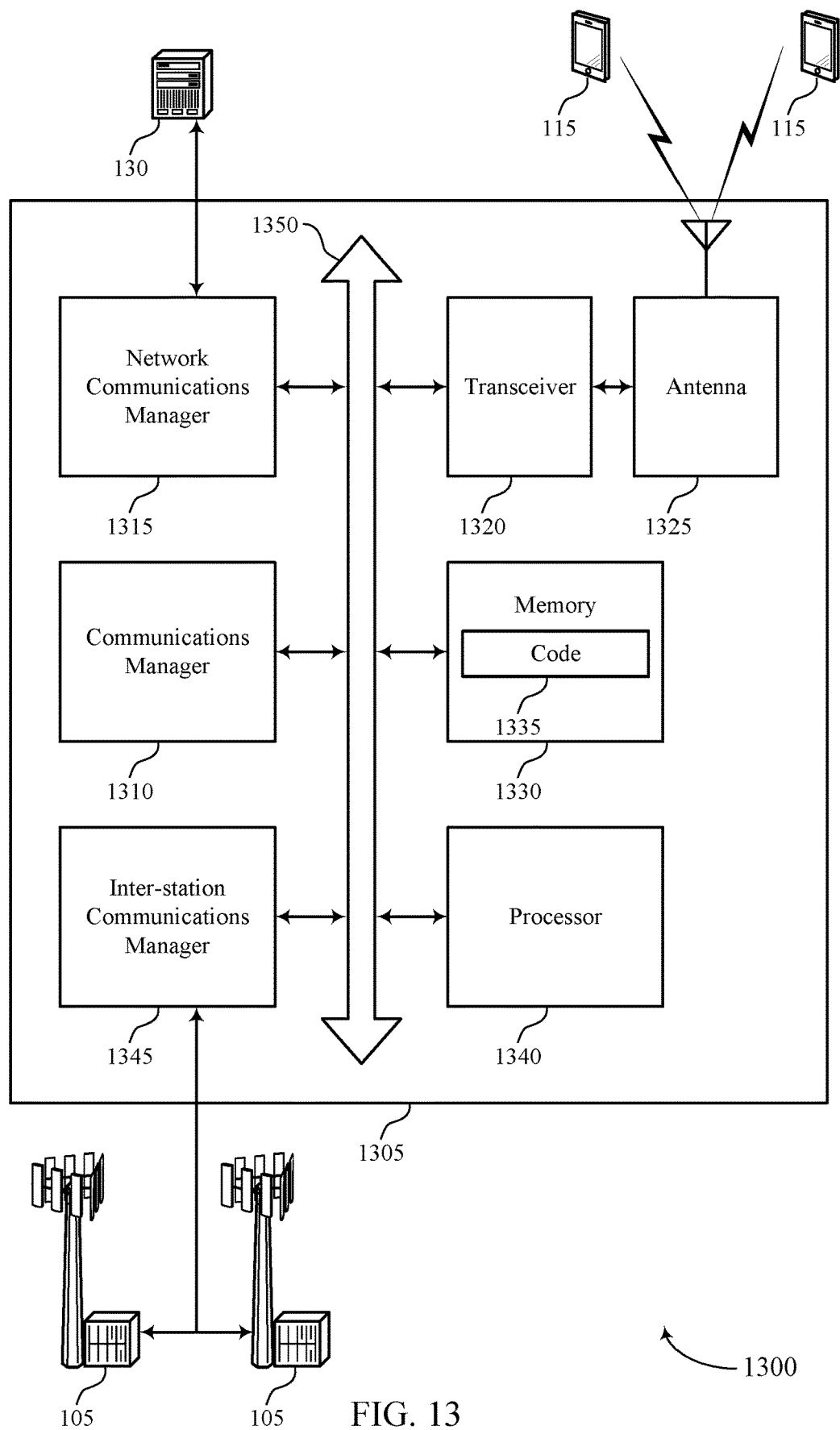
FIG. 13 shows a diagram of a system including a device that supports frequency diversity techniques for single frequency networks in accordance with aspects of the present disclosure.

FIG. 13 shows a diagram of a system 1300 including a device 1305 that supports frequency diversity techniques for single frequency networks in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a message with a first frequency configuration over a single frequency network channel using a directional beam, adjust the first frequency configuration to a second frequency configuration different from the first frequency configuration, and transmit a retransmission of the message with the second frequency configuration over the single frequency network channel.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting frequency diversity techniques for single frequency networks).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
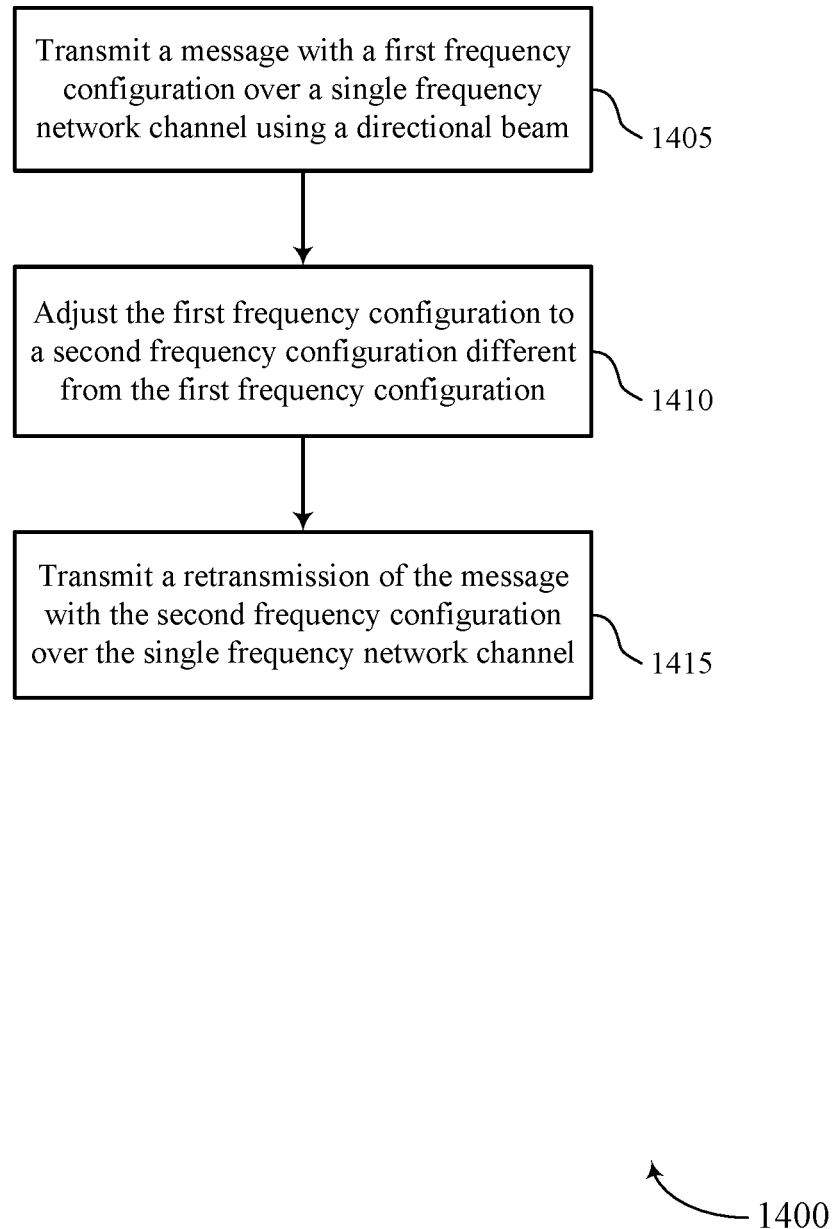
FIGS. 14 through 18 show flowcharts illustrating methods that support frequency diversity techniques for single frequency networks in accordance with aspects of the present disclosure.

FIG. 14 shows a flowchart illustrating a method 1400 that supports frequency diversity techniques for single frequency networks in accordance with aspects of the present disclosure. The operations of method 1400 may be implemented by a base station 105 or its components as described herein. For example, the operations of method 1400 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1405, the base station may transmit a message with a first frequency configuration over a single frequency network channel using a directional beam. The operations of 1405 may be performed according to the methods described herein. In some examples, aspects of the operations of 1405 may be performed by a first frequency transmit component as described with reference to FIGS. 10 through 13.

At 1410, the base station may adjust the first frequency configuration to a second frequency configuration different from the first frequency configuration. The operations of 1410 may be performed according to the methods described herein. In some examples, aspects of the operations of 1410 may be performed by a frequency reconfiguration component as described with reference to FIGS. 10 through 13.

At 1415, the base station may transmit a retransmission of the message with the second frequency configuration over the single frequency network channel. The operations of 1415 may be performed according to the methods described herein. In some examples, aspects of the operations of 1415 may be performed by a retransmission component as described with reference to FIGS. 10 through 13.

Figure 15:
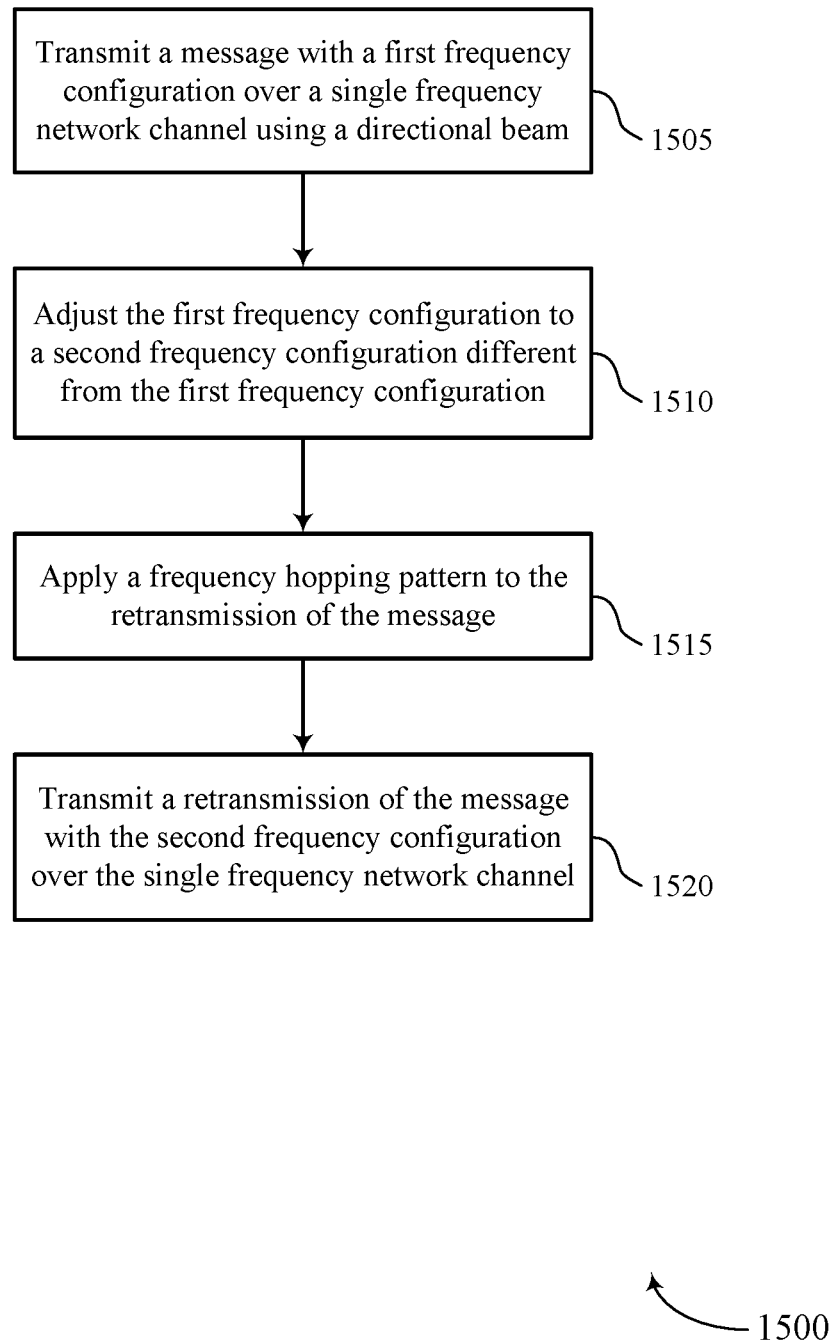

FIG. 15 shows a flowchart illustrating a method 1500 that supports frequency diversity techniques for single frequency networks in accordance with aspects of the present disclosure. The operations of method 1500 may be implemented by a base station 105 or its components as described herein. For example, the operations of method 1500 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1505, the base station may transmit a message with a first frequency configuration over a single frequency network channel using a directional beam. The operations of 1505 may be performed according to the methods described herein. In some examples, aspects of the operations of 1505 may be performed by a first frequency transmit component as described with reference to FIGS. 10 through 13.

At 1510, the base station may adjust the first frequency configuration to a second frequency configuration different from the first frequency configuration. The operations of 1510 may be performed according to the methods described herein. In some examples, aspects of the operations of 1510 may be performed by a frequency reconfiguration component as described with reference to FIGS. 10 through 13.

At 1515, the base station may apply a frequency hopping pattern to the retransmission of the message. The operations of 1515 may be performed according to the methods described herein. In some examples, aspects of the operations of 1515 may be performed by a frequency hopping component as described with reference to FIGS. 10 through 13.

At 1520, the base station may transmit a retransmission of the message with the second frequency configuration over the single frequency network channel. The operations of 1520 may be performed according to the methods described herein. In some examples, aspects of the operations of 1520 may be performed by a retransmission component as described with reference to FIGS. 10 through 13.

Figure 16:
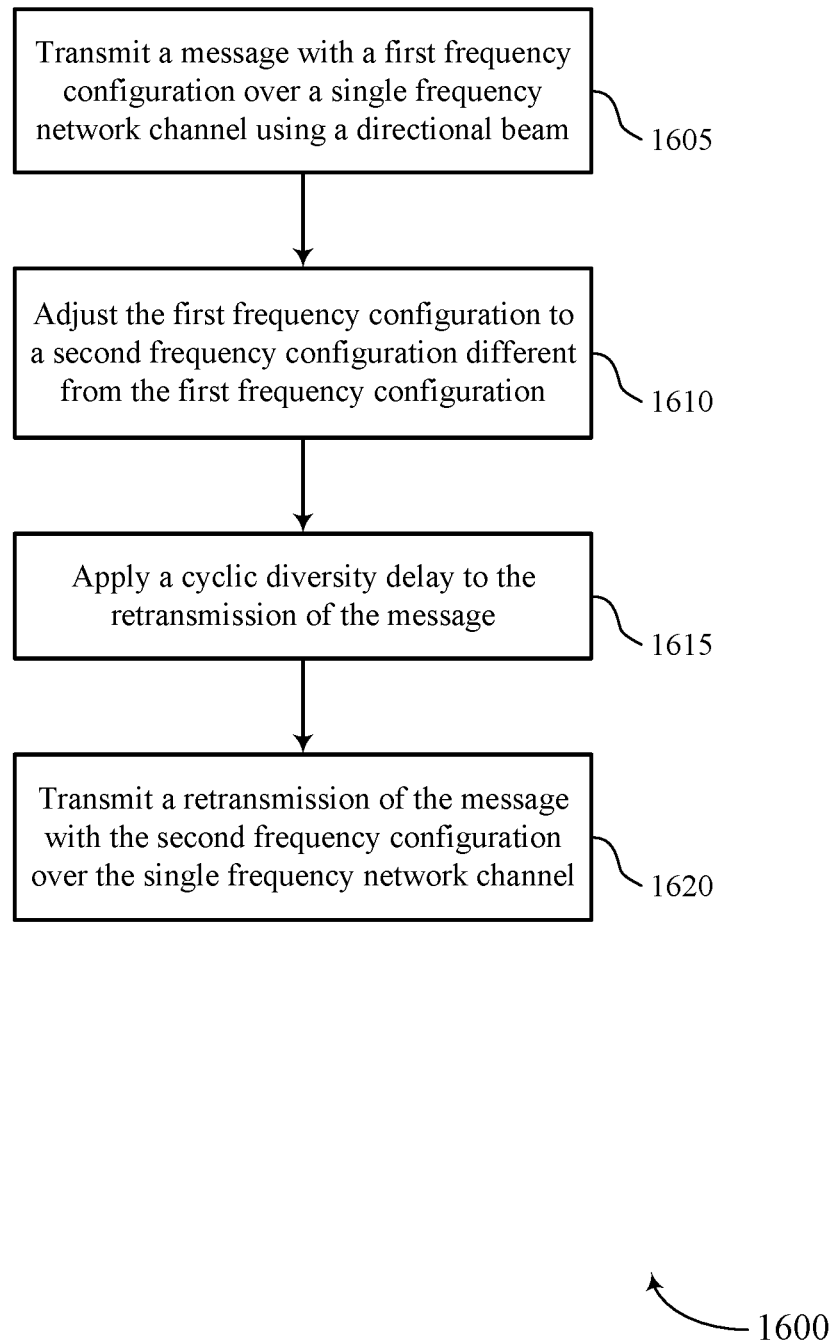

FIG. 16 shows a flowchart illustrating a method 1600 that supports frequency diversity techniques for single frequency networks in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may transmit a message with a first frequency configuration over a single frequency network channel using a directional beam. The operations of 1605 may be performed according to the methods described herein. In some examples, aspects of the operations of 1605 may be performed by a first frequency transmit component as described with reference to FIGS. 10 through 13.

At 1610, the base station may adjust the first frequency configuration to a second frequency configuration different from the first frequency configuration. The operations of 1610 may be performed according to the methods described herein. In some examples, aspects of the operations of 1610 may be performed by a frequency reconfiguration component as described with reference to FIGS. 10 through 13.

At 1615, the base station may apply a cyclic diversity delay to the retransmission of the message. The operations of 1615 may be performed according to the methods described herein. In some examples, aspects of the operations of 1615 may be performed by a CDD transmit component as described with reference to FIGS. 10 through 13.

At 1620, the base station may transmit a retransmission of the message with the second frequency configuration over the single frequency network channel. The operations of 1620 may be performed according to the methods described herein. In some examples, aspects of the operations of 1620 may be performed by a retransmission component as described with reference to FIGS. 10 through 13.

Figure 17:
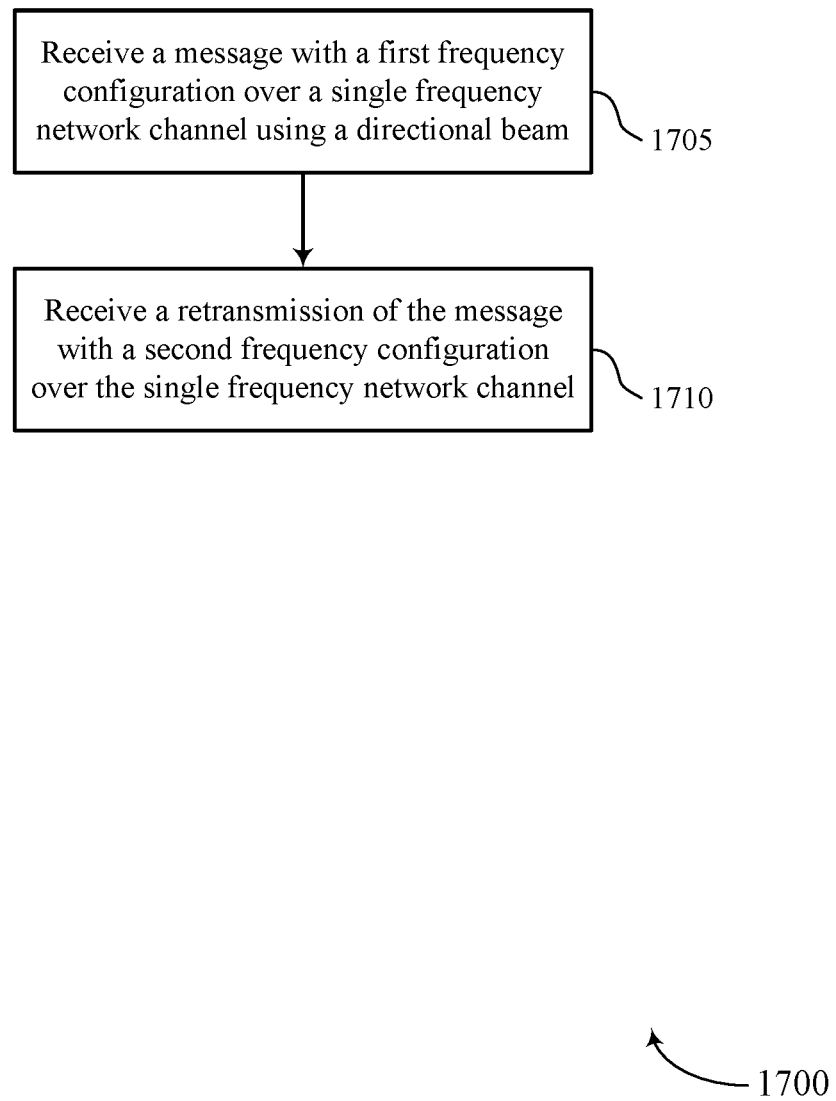

FIG. 17 shows a flowchart illustrating a method 1700 that supports frequency diversity techniques for single frequency networks in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may receive a message with a first frequency configuration over a single frequency network channel using a directional beam. The operations of 1705 may be performed according to the methods described herein. In some examples, aspects of the operations of 1705 may be performed by a first frequency receive component as described with reference to FIGS. 6 through 9.

At 1710, the UE may receive a retransmission of the message with a second frequency configuration over the single frequency network channel. The operations of 1710 may be performed according to the methods described herein. In some examples, aspects of the operations of 1710 may be performed by a retransmission component as described with reference to FIGS. 6 through 9.

Figure 18:
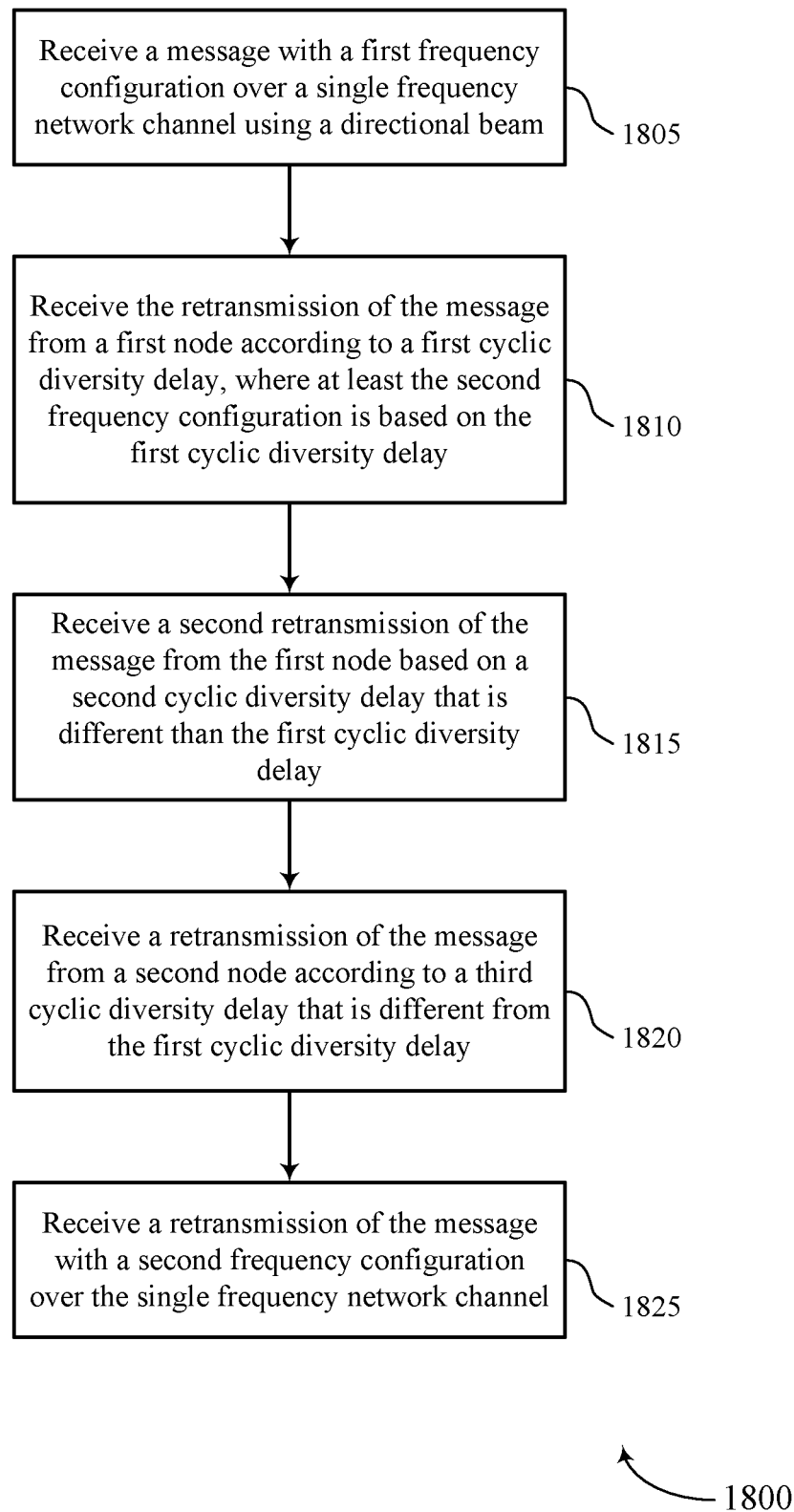

FIG. 18 shows a flowchart illustrating a method 1800 that supports frequency diversity techniques for single frequency networks in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may receive a message with a first frequency configuration over a single frequency network channel using a directional beam. The operations of 1805 may be performed according to the methods described herein. In some examples, aspects of the operations of 1805 may be performed by a first frequency receive component as described with reference to FIGS. 6 through 9.

At 1810, the UE may receive the retransmission of the message from a first node according to a first cyclic diversity delay, where at least the second frequency configuration is based on the first cyclic diversity delay. The operations of 1810 may be performed according to the methods described herein. In some examples, aspects of the operations of 1810 may be performed by a CDD receive component as described with reference to FIGS. 6 through 9.

At 1815, the UE may receive a second retransmission of the message from the first node based on a second cyclic diversity delay that is different than the first cyclic diversity delay. The operations of 1815 may be performed according to the methods described herein. In some examples, aspects of the operations of 1815 may be performed by a CDD receive component as described with reference to FIGS. 6 through 9.

At 1820, the UE may receive a retransmission of the message from a second node according to a third cyclic diversity delay that is different from the first cyclic diversity delay. The operations of 1820 may be performed according to the methods described herein. In some examples, aspects of the operations of 1820 may be performed by a CDD receive component as described with reference to FIGS. 6 through 9.

At 1825, the UE may receive a retransmission of the message with a second frequency configuration over the single frequency network channel. The operations of 1825 may be performed according to the methods described herein. In some examples, aspects of the operations of 1825 may be performed by a retransmission component as described with reference to FIGS. 6 through 9.

The following provides an overview of aspects of the present disclosure:

Aspect 1: A method for wireless communications at a base station, comprising: transmitting a message with a first frequency configuration over a single frequency network channel using a directional beam; adjusting the first frequency configuration to a second frequency configuration different from the first frequency configuration; and transmitting a retransmission of the message with the second frequency configuration over the single frequency network channel.

Aspect 2: The method of aspect 1, wherein adjusting the first frequency configuration comprises: applying a frequency hopping pattern to the retransmission of the message.

Aspect 3: The method of aspect 2, further comprising: transmitting an indication of the frequency hopping pattern.

Aspect 4: The method of any of aspects 2 through 3, wherein the first frequency configuration comprises a first set of tones allocated for the message and the second frequency configuration comprises a second set of tones allocated for the retransmission of the message that are different than the first set of tones.

Aspect 5: The method of any of aspects 1 through 4, wherein adjusting the first frequency configuration comprises: applying a cyclic diversity delay to the retransmission of the message.

Aspect 6: The method of aspect 5, further comprising: transmitting an indication of the cyclic diversity delay.

Aspect 7: The method of any of aspects 5 through 6, further comprising: receiving a request from a UE to apply the cyclic diversity delay.

Aspect 8: The method of any of aspects 5 through 7, wherein applying the cyclic diversity delay to the retransmission of the message comprises: transmitting the message using a first antenna; applying a first phase delay to at least a portion of the message at a second antenna; and transmitting the retransmission of the message based at least in part on the first phase delay.

Aspect 9: The method of aspect 8, further comprising: transmitting a second retransmission of the message based at least in part on a second phase delay that is different than the first phase delay.

Aspect 10: The method of any of aspects 1 through 9, further comprising: receiving a negative acknowledgement associated with the message, wherein transmitting the retransmission of the message is based at least in part on receiving the negative acknowledgement.

Aspect 11: The method of aspect 10, wherein the negative acknowledgement comprises a retransmission request associated with the message.

Aspect 12: The method of any of aspects 1 through 9, wherein the retransmission is transmitted automatically.

Aspect 13: The method of aspect 12, further comprising: transmitting the retransmission of the message upon expiration of a gap after transmitting the message.

Aspect 14: The method of any of aspects 1 through 13, wherein the message comprises a broadcast message.

Aspect 15: The method of any of aspects 1 through 14, wherein the single frequency network channel comprises a multimedia broadcast single frequency network channel.

Aspect 16: A method for wireless communications at a UE, comprising: receiving a message with a first frequency configuration over a single frequency network channel using a directional beam; and receiving a retransmission of the message with a second frequency configuration over the single frequency network channel.

Aspect 17: The method of aspect 16, further comprising: receiving the retransmission of the message according to a frequency hopping pattern, wherein at least the second frequency configuration is based at least in part on the frequency hopping pattern.

Aspect 18: The method of aspect 17, further comprising: receiving an indication of the frequency hopping pattern.

Aspect 19: The method of any of aspects 16 through 18, further comprising: receiving the retransmission of the message from a first node according to a first cyclic diversity delay, wherein at least the second frequency configuration is based at least in part on the first cyclic diversity delay.

Aspect 20: The method of aspect 19, further comprising: receiving an indication of the first cyclic diversity delay.

Aspect 21: The method of any of aspects 19 through 20, further comprising: receiving a second retransmission of the message from the first node based at least in part on a second cyclic diversity delay that is different than the first cyclic diversity delay.

Aspect 22: The method of any of aspects 19 through 21, further comprising: receiving the retransmission of the message from a second node according to a third cyclic diversity delay that is different from the first cyclic diversity delay.

Aspect 23: The method of any of aspects 19 through 22, further comprising: transmitting a request to a base station to apply the first cyclic diversity delay.

Aspect 24: The method of any of aspects 16 through 23, further comprising: receiving the retransmission of the message upon expiration of a gap after receiving the message.

Aspect 25: The method of any of aspects 16 through 24 further comprising: transmitting a negative acknowledgement associated with the message.

Aspect 26: The method of aspect 25, wherein the negative acknowledgement comprises a retransmission request associated with the message.

Aspect 27: An apparatus for wireless communications at a base station, comprising a processor; memory coupled with the processor; and instructions stored in the memory and executable by the processor to cause the apparatus to perform a method of any of aspects 1 through 15.

Aspect 28: An apparatus for wireless communications at a base station, comprising at least one means for performing a method of any of aspects 1 through 15.

Aspect 29: A non-transitory computer-readable medium storing code for wireless communications at a base station, the code comprising instructions executable by a processor to perform a method of any of aspects 1 through 15.

Aspect 30: An apparatus for wireless communications at a UE, comprising a processor; memory coupled with the processor; and instructions stored in the memory and executable by the processor to cause the apparatus to perform a method of any of aspects 16 through 24.

Aspect 31: An apparatus for wireless communications at a UE, comprising at least one means for performing a method of any of aspects 16 through 24.

Aspect 32: A non-transitory computer-readable medium storing code for wireless communications at a UE, the code comprising instructions executable by a processor to perform a method of any of aspects 16 through 24.

Aspect 33: An apparatus comprising a processor; memory coupled with the processor; and instructions stored in the memory and executable by the processor to cause the apparatus to perform a method of any of aspects 25 through 26.

Aspect 34: An apparatus comprising at least one means for performing a method of any of aspects 25 through 26.

Aspect 35: A non-transitory computer-readable medium storing code the code comprising instructions executable by a processor to perform a method of any of aspects 25 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a network device, comprising:
transmitting a broadcast message with a first frequency configuration over a single frequency network channel using a directional beam;
transmitting an indication of a second frequency configuration for at least one retransmission of the broadcast message, wherein the second frequency configuration is different from the first frequency configuration;
adjusting the first frequency configuration to the second frequency configuration; and
transmitting the at least one retransmission of the broadcast message with the second frequency configuration over the single frequency network channel.

2. The method of claim 1, wherein adjusting the first frequency configuration comprises:
applying a frequency hopping pattern to the at least one retransmission of the broadcast message.

3. The method of claim 2, further comprising:
transmitting an indication of the frequency hopping pattern.

4. The method of claim 2, wherein the first frequency configuration comprises a first set of tones allocated for the broadcast message and the second frequency configuration comprises a second set of tones allocated for the at least one retransmission of the broadcast message that are different than the first set of tones.

5. The method of claim 1, wherein adjusting the first frequency configuration comprises:
applying a cyclic diversity delay to the at least one retransmission of the broadcast message.

6. The method of claim 5, further comprising:
transmitting an indication of the cyclic diversity delay.

7. The method of claim 5, further comprising:
receiving a request from a user equipment (UE) to apply the cyclic diversity delay.

8. The method of claim 5, wherein applying the cyclic diversity delay to the at least one retransmission of the broadcast message comprises:
transmitting the broadcast message using a first antenna;
applying a first phase delay to at least a portion of the broadcast message at a second antenna; and
transmitting the at least one retransmission of the broadcast message based at least in part on the first phase delay.

9. The method of claim 8, further comprising:
transmitting a second retransmission of the broadcast message based at least in part on a second phase delay that is different than the first phase delay.

10. The method of claim 1, further comprising:
receiving a negative acknowledgement associated with the broadcast message, wherein transmitting the at least one retransmission of the broadcast message is based at least in part on receiving the negative acknowledgement.

11. The method of claim 10, wherein the negative acknowledgement comprises a retransmission request associated with the broadcast message.

12. The method of claim 1, wherein the at least one retransmission is transmitted automatically.

13. The method of claim 12, further comprising:
transmitting the at least one retransmission of the broadcast message upon expiration of a gap after transmitting the broadcast message.

14. The method of claim 1, wherein the single frequency network channel comprises a multimedia broadcast single frequency network channel.

15. A method for wireless communications at a user equipment (UE), comprising:
receiving a broadcast message with a first frequency configuration over a single frequency network channel using a directional beam;

receiving a message with an indication of a second frequency configuration for at least one retransmission of the broadcast message; and receiving a retransmission of the message with the second frequency configuration over the single frequency network channel.

16. The method of claim 15, further comprising:

receiving the at least one retransmission of the broadcast message according to a frequency hopping pattern, wherein at least the second frequency configuration is based at least in part on the frequency hopping pattern.

17. The method of claim 16, further comprising:

receiving an indication of the frequency hopping pattern.

18. The method of claim 15, further comprising:

receiving the at least one retransmission of the broadcast message from a first node according to a first cyclic diversity delay, wherein at least the second frequency configuration is based at least in part on the first cyclic diversity delay.

19. The method of claim 18, further comprising:

receiving an indication of the first cyclic diversity delay.

20. The method of claim 18, further comprising:

receiving a second retransmission of the broadcast message from the first node based at least in part on a second cyclic diversity delay that is different than the first cyclic diversity delay.

21. The method of claim 18, further comprising:

receiving the at least one retransmission of the broadcast message from a second node according to a third cyclic diversity delay that is different from the first cyclic diversity delay.

22. The method of claim 18, further comprising:

transmitting a request to a network device to apply the first cyclic diversity delay.

23. The method of claim 15 further comprising:

transmitting a negative acknowledgement associated with the broadcast message.

24. The method of claim 23, wherein the negative acknowledgement comprises a retransmission request associated with the broadcast message.

25. The method of claim 15, further comprising:

receiving the at least one retransmission of the broadcast message upon expiration of a gap after receiving the broadcast message.

26. An apparatus for wireless communications at a network device, comprising:

a processor, memory coupled with the processor; and instructions stored in the memory and executable by the processor to cause the apparatus to:

transmit a broadcast message with a first frequency configuration over a single frequency network channel using a directional beam;

transmit an indication of a second frequency configuration for at least one retransmission of the broadcast message, wherein the second frequency configuration is different from the first frequency configuration;

adjust the first frequency configuration to the second frequency configuration different from the first frequency configuration; and transmit the at least one retransmission of the broadcast message with the second frequency configuration over the single frequency network channel.

27. The apparatus of claim 26, wherein the instructions to adjust the first frequency configuration are executable by the processor to cause the apparatus to:

apply a frequency hopping pattern to the at least one retransmission of the broadcast message.

28. The apparatus of claim 27, wherein the instructions are further executable by the processor to cause the apparatus to:

transmit an indication of the frequency hopping pattern.

29. An apparatus for wireless communications at a user equipment (UE), comprising:

a processor, memory coupled with the processor; and instructions stored in the memory and executable by the processor to cause the apparatus to:

receive a broadcast message with a first frequency configuration over a single frequency network channel using a directional beam;

receive a message with an indication of a second frequency configuration for at least one retransmission of the broadcast message; and receive a retransmission of the message with the second frequency configuration over the single frequency network channel.

* * * * *